United States Patent
Bennett et al.

(10) Patent No.: US 9,191,325 B2
(45) Date of Patent: *Nov. 17, 2015

(54) METHOD AND SYSTEM FOR PROCESSING NETWORK TRAFFIC FLOW DATA

(71) Applicant: SOLANA NETWORKS INC., Ottawa (CA)

(72) Inventors: Donald William Arthur Bennett, Conception Bay South (CA); Nisan Rowhani, Gloucester (CA); Biswajit Nandy, Kanata (CA); Kevin Wong, Nepean (CA)

(73) Assignee: SOLANA NETWORKS INC., Ottawa, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 14/066,610

(22) Filed: Oct. 29, 2013

(65) Prior Publication Data

US 2015/0120856 A1    Apr. 30, 2015

(51) Int. Cl.
*H04L 12/801* (2013.01)
*G06F 15/167* (2006.01)
*H04L 12/26* (2006.01)

(52) U.S. Cl.
CPC .............. *H04L 47/10* (2013.01); *G06F 15/167* (2013.01); *H04L 43/0876* (2013.01)

(58) Field of Classification Search
CPC ... H04L 47/10; H04L 29/06; H04L 29/08072; H04L 12/5695; H04L 29/06523
See application file for complete search history.

(56) References Cited

U.S. PATENT DOCUMENTS

| | | | |
|---|---|---|---|
| 7,215,637 B1 | 5/2007 | Ferguson et al. | |
| 8,005,012 B1* | 8/2011 | Aybay et al. | 370/253 |
| 8,179,799 B2 | 5/2012 | Dolisy | |
| 8,510,830 B2 | 8/2013 | Reilly | |
| 2009/0300210 A1 | 12/2009 | Ferris | |
| 2011/0292818 A1 | 12/2011 | Zhytar et al. | |
| 2012/0014282 A1* | 1/2012 | Pappu et al. | 370/253 |
| 2012/0310952 A1 | 12/2012 | Reilly | |

OTHER PUBLICATIONS

Claise, Ed, Cisco Systems NetFlow Services Export Version 9, Network Working Group, Request for Comments (RFC) 3954, The Internet Society, Oct. 2004, pp. 1-34.

Quittek, J, et al., Requirements for IP Flow Information Export (IPFIX), Network Working Group, Request for Comments (RFC) 3917, The Internet Society, Oct. 2004, pp. 1-34.

(Continued)

*Primary Examiner* — David X Yi
*Assistant Examiner* — Hien Doan
(74) *Attorney, Agent, or Firm* — IP-MEX, Inc.; Victoria Donnelly

(57) ABSTRACT

Network traffic flow records received from a network probe are recorded in multiple sets of buckets of different granularity, optimized for the purpose of almost instant analysis and display as well as for longer term report generation. The flow data is pre-processed and stored redundantly in parallel in multiple bucketized data base tables of different time window sizes. Denormalized tables keyed on different combinations of traffic flow attributes are precomputed and stored in parallel tables redundantly to facilitate a near real time display of summarized network traffic data, and a capability to rapidly generate reports for different monitoring periods.

20 Claims, 11 Drawing Sheets

(56) References Cited

OTHER PUBLICATIONS

Rajahalme, J, et al., IPv6 Flow Label Specification, Network Working Group, Request for Comments (RFC) 3697, The Internet Society, Mar. 2004, pp. 1-10.

http://en/wikipedia/org/wiki/NetFlow; Article printed from the Internet Oct. 28, 2013, pp. 1-9.

www.lgosys.com/products/frameseer.html; Printed from the Internet Oct. 2013, pp. 1-4.

* cited by examiner

METHOD AND SYSTEM FOR PROCESSING NETWORK TRAFFIC FLOW DATA

FIELD OF THE INVENTION

The present invention relates to monitoring of network traffic, and in particular to a method and system for processing network traffic flow data.

BACKGROUND OF THE INVENTION

In computer networks, it is frequently of interest to monitor and analyse network traffic flows for any number of purposes, such as network capacity planning, user billing, or security reasons for example.

In Internet Protocols (IP) networks, a network traffic flow may be defined as a unidirectional sequence of packets that all share a number of attribute values such as IP source and destination address, port numbers, etc. An article at Wikipedia entitled "Netflow", cited in the information disclosure statement for this application, describes a network traffic flow reporting protocol that was originally introduced by Cisco Corporation under the name NetFlow.

Methods for recording and displaying such network traffic flow information are described in the prior art, for example in US patent application 2012/0310952 and U.S. Pat. No. 8,510,830. Because of the increasingly high volume of network traffic flows, the implementation of efficient monitoring and analysis poses unique challenges, requiring optimizations which depend on the purpose of obtaining the network traffic flow information and analyzing or displaying it. Because of the large amount of network traffic to be analyzed, efficient near real-time processing of network traffic flow data continues to be a problem.

SUMMARY OF THE INVENTION

Therefore there is an object of the invention to provide an improved method and system for efficiently processing network traffic flow information to enable near-real time interactive display and report generation of analysis results.

According to one aspect of the invention, there is provided a method for processing traffic flow data received from a network probe device, comprising:
 (a) determining a statistical traffic flow profile of traffic flow data, comprising a distribution of number of traffic flows according to respective byte sizes;
 (b) selecting, from said distribution, a given byte size so that an aggregate of bytes in traffic flows having a size below the given byte size represents a predetermined small percentage of aggregate bytes in all traffic flows in said distribution;
 (c) setting a traffic flow size threshold to the given byte size; and
 (d) retaining flow records of those traffic flows whose byte size is above the flow size threshold, and discarding flow records for the remaining traffic flows.

The method further comprises:
 repeating the determining the statistical traffic flow profile, including repeating the determining of the distribution;
 dynamically selecting, from said periodically determined distribution, the given byte size; and
 setting a traffic flow size threshold to the given byte size.

In the embodiments of the invention, the given byte size has been chosen in a range from about 64 bytes to about 1 kB; and the predetermined percentage has been chosen in a range from about 0.1% to about 5%.

The method further comprises generating a database structure containing the retained flow records, and deleting from the database structure, for the purpose of an analysis of historical traffic flow data, flow records associated with traffic flows below a X percent size relative to an average traffic flow size, while maintaining at least a predetermined analysis accuracy.

Conveniently, the value of X is in a range from about 5 to about 15%, corresponding to the predetermined analysis accuracy in the range from about 98% to about 95% respectively.

In the method described above, the step (d) further comprises retaining the flow records in memory buckets of a first and a second bucket chain, corresponding to a first and second predetermined time windows, and aggregating bytes sizes of flows in each memory bucket.

In the embodiments of the invention, the first predetermined time window is about T seconds, and the second predetermined time window is equal to a period of M times the first predetermined time window, and covering the same time interval as M of the first predetermined time windows.

In the method described above, the step (d) further comprises:
 for each memory bucket in the second bucket chain, filling said each memory bucket with summarized flow records of the corresponding M memory buckets of the first bucket chain; and
 further summarizing the summarized flow records of the memory buckets of the second bucket chain into secondary summarized flow records.

In the method described above, the step (d) further comprises selecting at least two different sets of selected flow attributes and storing respective at least two sets of summarized flow records in corresponding at least two data structures.

The step (d) may further comprise splitting any flow record that characterizes a traffic flow whose time period extends over parts of two consecutive bucket time windows, into two flow records each having partial traffic flow sizes assigned to equal a respective fraction of the traffic flow size according to the portion of the time period of the traffic flow that falls in each corresponding bucket time window respectively.

The step (d) may further comprise delaying the aggregating until the longest traffic flow is completed.

Yet alternatively, the step (d) may be performed in multiple processors for processing different flows in parallel.

According to yet another aspect of the invention, there is provided a system for processing traffic flow data received from a network probe, the system comprising:
 a processor and a non-transitory computer readable storage medium having computer readable instructions stored thereon for execution by the processor, causing the processor to:
  (a) determine a statistical traffic flow profile of traffic flow data, comprising a distribution of number of traffic flows according to respective byte sizes;
  (b) select, from said distribution, a given byte size so that an aggregate of bytes in traffic flows having a size below the given byte size represents a predetermined small percentage of aggregate bytes in all traffic flows in said distribution;
  (c) set a traffic flow size threshold to the given byte size; and
  (d) retain flow records of those traffic flows whose byte size is above the flow size threshold, and discard flow records for the remaining traffic flows.

In the system described above, the processor is further configured to:
repeat determining the statistical traffic flow profile and the distribution, and dynamically select, from said repeatedly determined distribution, the given byte size; and
set the traffic flow size threshold to the given byte size.

In the system described above, the given byte size is in a range from about 64 bytes to about 1 kB.

In the system described above, the predetermined percentage is in a range from about 0.05% to about 10%.

The processor is further configured to generate a database structure containing the retained flow records, and the processor is further configured to delete from the database structure flow records associated with traffic flows below a X percent size relative to an average traffic flow size, while maintaining at least a predetermined analysis accuracy.

In some embodiments of the invention, the value of X is in a range from about 5 to 15%, corresponding to the predetermined analysis accuracy in the range of 98 to 95% respectively.

In the system described above, the processor is further configured to retain the flow records in memory buckets of a first and a second bucket chain, corresponding to a first and second predetermined time windows, and aggregate bytes sizes of flows in each memory bucket.

In the system of the embodiments of the invention, the first predetermined time window is about T seconds, and the second predetermined time window is equal to a period of M times the first predetermined time window, and covering the same time interval as M of the first predetermined time windows.

In the system described above, the processor is further configured to:
for each memory bucket in the second bucket chain, fill said each memory bucket with summarized flow records of the corresponding M memory buckets of the first bucket chain; and
further summarize the summarized flow records of the memory buckets of the second bucket chain into secondary summarized flow records.

In the system described above, the processor is further configured to select at least two different sets of selected flow attributes and store respective at least two sets of summarized flow records in corresponding at least two data structures.

Yet further the processor is configured to split any flow record that characterizes a traffic flow whose time period extends over parts of two consecutive bucket time windows, into two flow records each having partial traffic flow sizes assigned to equal a respective fraction of the traffic flow size according to the portion of the time period of the traffic flow that falls in each corresponding bucket time window respectively.

Conveniently, the processor is further configured to delay the aggregating until the longest traffic flow is completed.

To expedite the processing of multiple traffic flows, the system may comprise multiple processors for processing different flows in parallel.

According to yet another aspect of the invention, there is provided a method for processing network traffic flow data, comprising:
(a) storing flow records characterizing traffic flows, obtained from a network probe device, in memory buckets of first and second bucket chains, the first and second bucket chains having memory buckets corresponding to respective first and second predetermined time windows, wherein the first predetermined time window is about T seconds, and the second predetermined time window is equal to a period of M times the first predetermined time window, and covering the same time interval as M of the first predetermined time windows; and
(b) for each memory bucket, aggregating sizes of the stored flow records, having the same values of selected flow attributes, into summarized flow records.

The method further comprises processing the summarized flow records for further displaying or reporting.

The method described above further comprises selecting the second predetermined time window significantly larger than the first predetermined time window.

In the method described above, the step (b) further comprises:
selecting each second predetermined time window equal to, and coincident with, M of the first predetermined time windows, to cover the same time interval;
for each memory bucket in the second bucket chain, filling said each memory bucket with the summarized flow records of the corresponding M memory buckets of the first bucket chain.

In the method described above, the step (b) further comprises aggregating the summarized flow records of the second bucket chain, which are obtained from the summarized records of the first bucket chain.

Alternatively, the step (b) may further comprise selecting at least two different sets of selected flow attributes and storing respective at least two sets of summarized flow records in corresponding data structures.

Yet alternatively, the step (b) may further comprise pre-computing the at least two data structures in preparation for a traffic flow analysis.

In the method described above, the step (a) comprises splitting any flow record that characterizes a traffic flow whose time period extends over parts of two consecutive bucket time windows, into two flow records each having partial traffic flow sizes assigned equal to a respective fraction of the traffic flow size according to the portion of the time period of the traffic flow that falls in each bucket time window respectively.

Conveniently, the step (b) of the method may further comprise delaying the aggregating until the longest traffic flow is completed.

In one of the embodiments of the invention, the first time interval is T=30 seconds, and M is 12.

The number of buckets in the first bucket chain is limited to M plus a margin equal for example to a memory space occupied by at least one memory bucket, and wherein the oldest data is deleted before starting a next bucket window to keep the number of buckets below the limit.

Additionally, the step (a) of the method may further comprise storing only flow records characterizing traffic flows of at least a byte size that exceeds a predetermined given byte size.

In the embodiments of the invention, the given byte size is determined by: determining a statistical flow profile of traffic flow data, comprising a distribution of number of traffic flows according to respective byte sizes;
selecting, from said distribution, a given byte size so that an aggregate of bytes in traffic flows having a size below the given byte size represents a predetermined small percentage of aggregate bytes in all traffic flows in said distribution; and
setting a flow size threshold to the given byte size.

For example, the given byte size may be chosen in a range from about 64 bytes to about 1 kB.

In the method described above, the step (b) may further comprise limiting processing of the summarized flow records to those summarized flow records, which characterize traffic flows of a byte size of at least X percent of an average bytesize of all stored traffic flows.

In some embodiments of the invention, the value of X is in a range from about 5 to 15%, corresponding to the predetermined analysis accuracy in the range of 98 to 95% respectively, for example X may be equal to about 15%.

In some embodiments of the invention, the steps (a) and (b) are performed in multiple processors by processing different traffic flows in parallel.

According to yet one more aspect of the invention, there is provided a system for processing traffic flow data received from a network probe device, comprising:
  a processor and a computer readable storage medium having computer readable instructions stored thereon for execution by the processor, causing the processor to:
  (a) store flow records characterizing traffic flows, obtained from the network probe device, in memory buckets of first and second bucket chains, the first and second bucket chains having memory buckets corresponding to respective first and second predetermined time windows, wherein the first predetermined time window is about T seconds, and the second predetermined time window is equal to a period of M times the first predetermined time window, and covering the same time interval as M of the first predetermined time windows;
  (b) for each memory bucket, aggregate sizes of the stored flow records, having the same values of selected flow attributes, into summarized flow records.

In the system described above, the processor is further configured to process the summarized flow records for further displaying or reporting.

In the system described above, the second predetermined time window is significantly larger than the first predetermined time window.

According to embodiments of the invention, the processor is further configured to:
  select each second predetermined time window equal to, and coincident with, M of the first predetermined time windows, to cover the same time interval; and
  for each memory bucket in the second bucket chain, fill said each memory bucket with the summarized flow records of the corresponding M memory buckets of the first bucket chain.

The processor is further configured to aggregate the summarized flow records of the second bucket chain, which are obtained from the summarized records of the first bucket chain.

In some embodiments of the invention, the processor may be further configured to select at least two different sets of selected flow attributes and store respective at least two sets of summarized flow records in corresponding data structures.

The processor may also be further configured to pre-compute the at least two data structures in preparation for a traffic flow analysis.

In some embodiments of the invention, the processor is further configured to split any flow record that characterizes a traffic flow whose time period extends over parts of two consecutive bucket time windows, into two flow records each having partial traffic flow sizes assigned equal to a respective fraction of the traffic flow size according to the portion of the time period of the traffic flow that falls in each bucket time window respectively.

Conveniently, the processor is further configured to delay the aggregating until the longest traffic flow is completed.

For example, the first time interval may be selected to be equal to T=30 seconds, and M=12.

The processor is further configured to limit the number of buckets in the first bucket chain to M plus optionally a small margin, and delete the oldest data before starting a next bucket window to keep the number of buckets below the limit.

In some other embodiments of the invention, the processor is further configured to store only flow records characterizing traffic flows of at least a byte size that exceeds a predetermined given byte size.

The processor is further configured to determine the given byte size, as follows: to determine a statistical flow profile of traffic flow data, comprising a distribution of number of traffic flows according to respective byte sizes;
  to select, from said distribution, the given byte size so that an aggregate of bytes in traffic flows having a size below the given byte size represents a predetermined small percentage of aggregate bytes in all traffic flows in said distribution; and
  to set a flow size threshold to the given byte size.

For example, the given byte size may be selected in a range from about 64 bytes to about 1 kB.

The processor may be further configured to limit the processing of the summarized flow records to those summarized flow records, which characterize traffic flows of a byte size of at least X percent of an average bytesize of all stored traffic flows. For example, X may be in a range from about 5% to about 15%.

In yet another embodiment of the invention, the system comprises multiple processors by processing different traffic flows in parallel.

Thus, an improved method and system for efficiently processing network traffic flow information to enable efficient near-real time interactive display and report generation of analysis results have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

One of the objectives of the proposed traffic monitoring tool is to present the user with a clear and simple visibility to their network traffic. The user interface of the tool is a web-based dashboard that is updated in near real-time and provides drill-down operations to retrieve increasing amount of detail from the dashboard gadgets, as well as long term report generation.

Embodiments of the present invention provide improved methods for processing network traffic flow data and providing an interactive user interface for displaying the processed data in near-real time and generating reports.

Figure 1A:
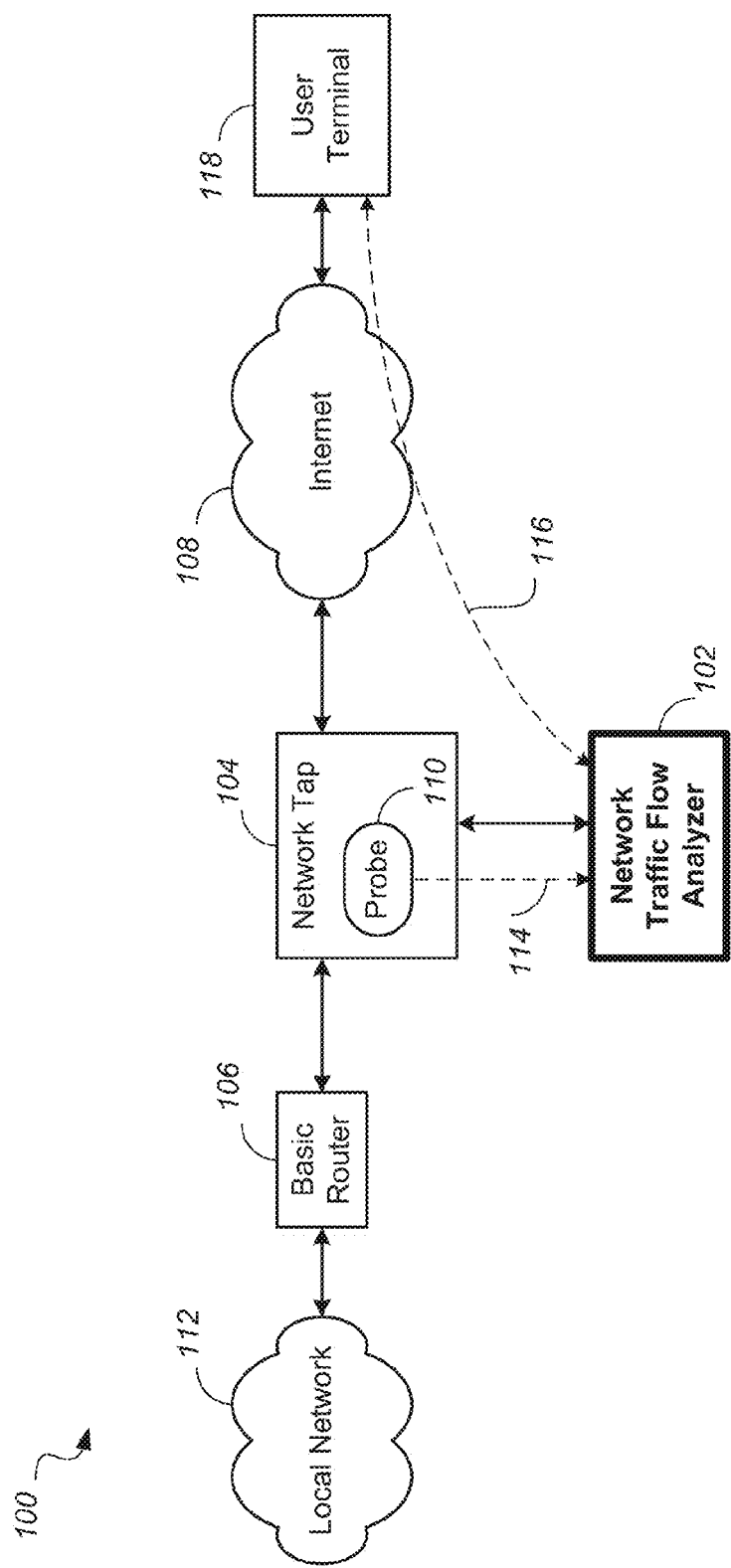
FIG. 1A illustrates a first deployment architecture 100 including a Network Traffic Flow Analyzer 102 of an embodiment of the invention.

FIG. 1A illustrates a first deployment architecture 100 including a Network Traffic Flow Analyzer 102 of an embodiment of the invention. The first deployment architecture 100 further includes a Network Tap 104 in which network traffic flow between a Router 106 and the Internet 108 is monitored with a Probe 110. The first deployment architecture 100 may further include a Local Network 112 which can access the Internet 108 through the Router 106.

The Probe 110 monitors the network traffic, i.e. data packets, flowing between the Internet 108 and the Router 106, and generates network traffic flow data in the form of traffic flow records, each flow record describing a "traffic flow" or "flow" as commonly understood in the field of internet protocols.

Standard definitions of "traffic flow" may be found in IETF (Internet Engineering Task Force) RFC (Request For Comments) documents RFC 3697, RFC 3954 and RFC 3917.

The Network Traffic Flow Analyzer 102 is connected to the Network Tap 104 and receives a continuous stream of traffic flow records 114 from the Probe 110. Through a periodic command/response connection 116 through the Internet 108, the Network Traffic Flow Analyzer 102 may communicate with a remotely located User Terminal 118. Alternatively, the User Terminal 118 may be locally connected to, or physically combined with, the Network Traffic Flow Analyzer 102.

Figure 1B:
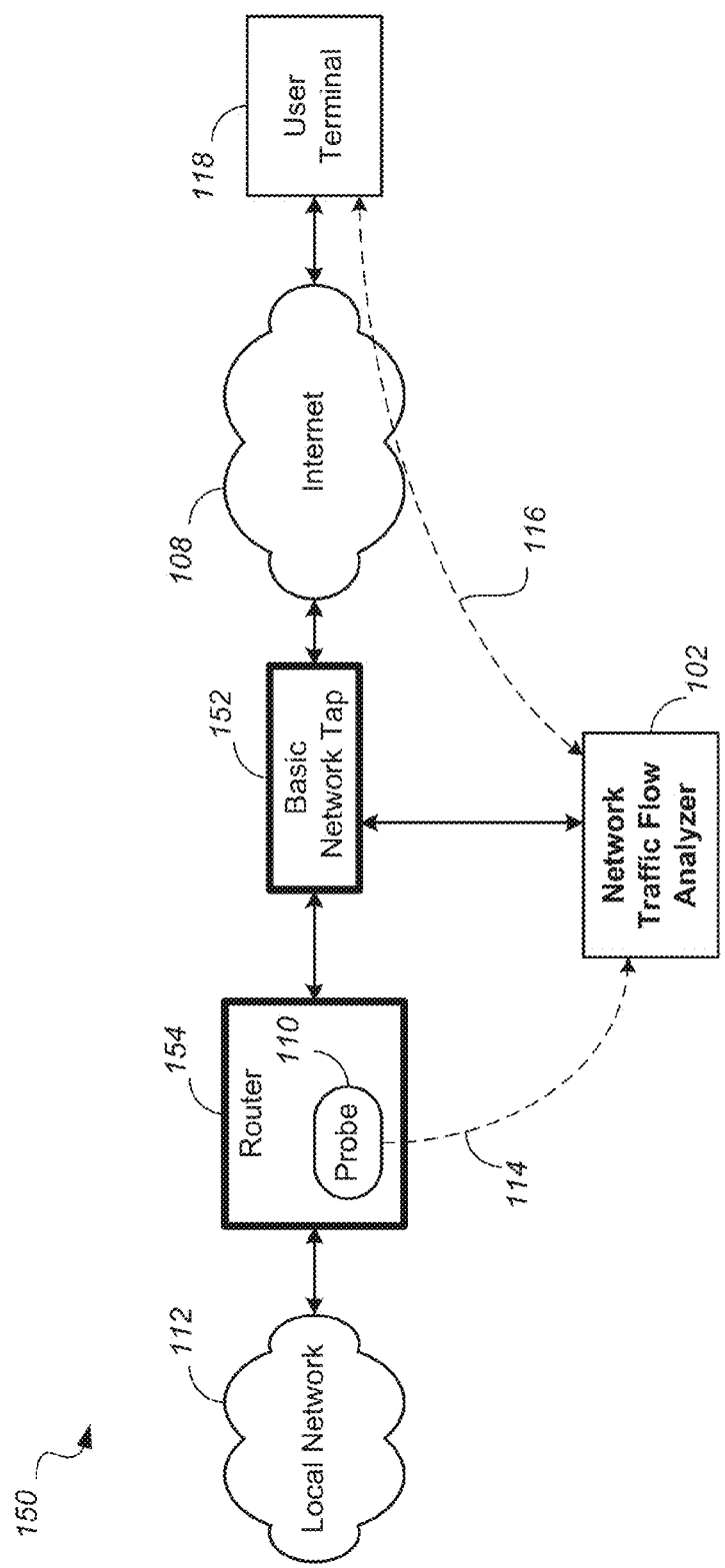
FIG. 1B illustrates a second deployment architecture 150, which differs from the first deployment architecture 100 only in the location of the Probe 110.

FIG. 1B illustrates a second deployment architecture 150, which differs from the first deployment architecture 100 only in the location of the Probe 110, by including a Basic Network Tap 152 which does not contain a Probe 110, and a Router 154 which does contain the Probe 110 instead. In both architectures 100 and 150, the Network Traffic Flow Analyzer 102 receives the flow records 114 from the Probe 110.

In a third alternative (not illustrated), the Basic Network Tap 152 passively copies packets flowing between the Router 106 and the Internet 108, and sends the copied packets to a probe that is installed in, or directly connected to, the Network Traffic Flow Analyzer 102.

More complex deployment architectures of the Network Traffic Flow Analyzer 102, which may be connected to probes at multiple locations in a network, or receiving traffic flow records 114 from multiple routers that are equipped with probes, may also be envisaged.

Briefly summarized, the function of the Network Traffic Flow Analyzer 102 is to process the received flow records 114, generate digests of the data for: storing in a database; displaying in near-real time; and generating reports. A web interface in the Network Traffic Flow Analyzer 102 provides support for user interactions through the User Terminal 118.

Figure 1C:
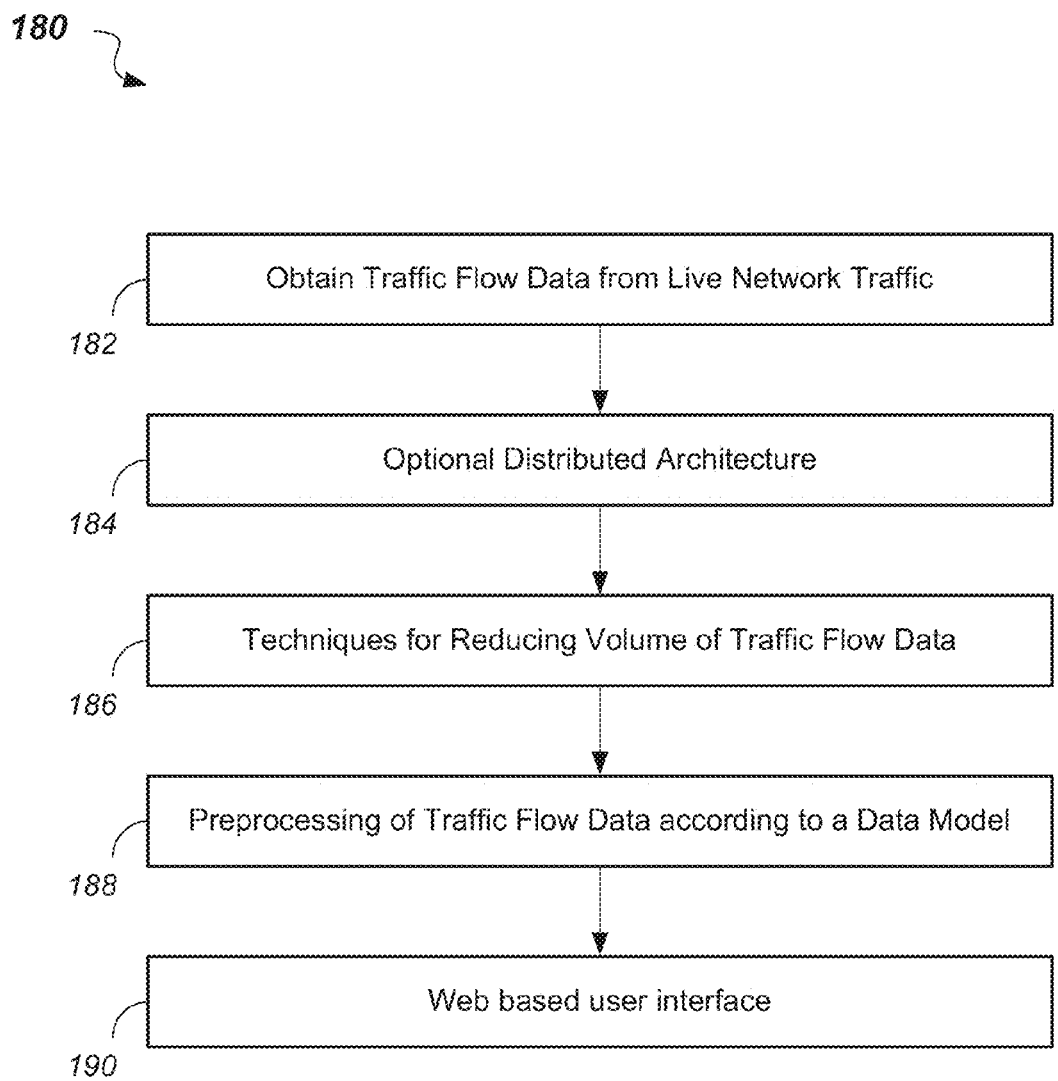
FIG. 1C illustrates a high level summary 180 of functionality of the Network Traffic Flow Analyzer 102.

FIG. 1C illustrates a high level summary 180 of functionality of the Network Traffic Flow Analyzer 102, including:

182: Traffic flow data from live network traffic, is obtained from one or more probes as streams of traffic flow records 114;

184: The Network Traffic Flow Analyzer 102 may optionally be realized in a distributed architecture for dynamically allocating sufficient resources to enable near-real time dashboard operation (e.g. display refreshed in less than one second after arrival of new flow data) and long term report generation taking less than one minute without increasing processor load significantly, both to achieve a consistent user experience;

186: Techniques for reducing volume of traffic flow data, both by immediately discarding received traffic flow data that is of low statistical significance to reduce the preprocessing effort, and for generating long reports, dynamically selecting thresholds in order to gain performance improvements without a significant loss of accuracy;

188: Preprocessing of traffic flow data according to a data model for storage of traffic data in the database, resulting in more efficient retrieval; and

190: A Web based user interface, using a "dashboard" concept, to provide flexible display of traffic results and user control of display options as well as delivery of reports.

Figure 2:
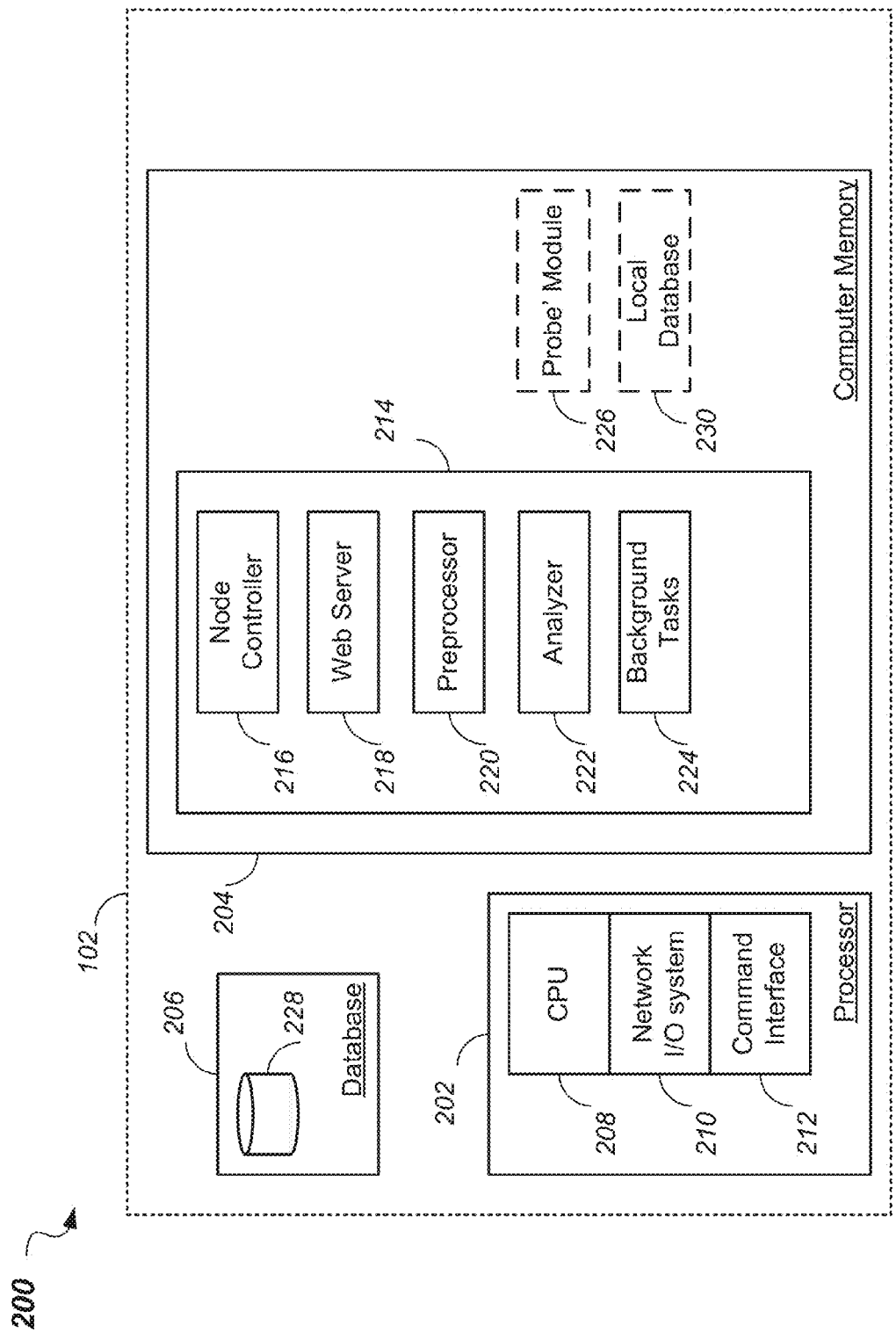
FIG. 2 shows a Single Node embodiment 200 of the Network Traffic Flow Analyzer 102.

FIG. 2 shows a Single Node embodiment 200 of the Network Traffic Flow Analyzer 102, including a Processor 202, a Computer Memory 204, and a Database 206.

The Processor 202 may be any commercial processor capable of executing programs under an operating system such as, but not limited to, Linux, Microsoft Windows, or Mac Operating System 10 (OSX) for example, comprising a Central Processing Unit (CPU) 208, a Network Input/Output (I/O) system 210 and a Command Interface 212.

The CPU 208 may be any of a number of commercial processor implementations, including a multi-processor. The Network Input/Output (I/O) system 210 provides an interface facility to the Network Tap 104 or the Basic Network Tap 152, see FIGS. 1A and 1B respectively, for receiving the flow records 114 and communicating with the User Terminal 118. The Command Interface 212 may include a keyboard, mouse, and visual interface, as well as removable storage devices, or any other hardware suitable for controlling a software configuration as well as the operations of the Network Traffic Flow Analyzer 102.

The Processor 202 is connected to the Computer Memory 204 which is preferably a non-transitory computer readable storage medium, for example a memory device, such as dynamic random access memory (DRAM) capable of storing software programs and related data.

Software modules, which include computer executable instructions for execution by the Processor 202 are stored in the Computer Memory 204, comprise a Node package 214 including:

a Node Controller module 216, responsible for managing a node and all the other components running within;

a Web Server module 218, providing backend support for a web client in the User Terminal 118 for handling user interactions. The Web Server module 218 also provides a Representational State Transfer (REST) application programming interface (API) through which third party applications may be integrated with the system;

a Preprocessor module 220, responsible for turning raw network traffic data received with the flow records 114 into an optimized internal representation;

an Analyzer module 222, which performs processing of the network traffic data and their analysis.

and a Background Tasks component 224, which performs post-processing operations on preprocessed traffic flow data.

In some embodiments of the invention, the software modules stored in the Computer Memory 204 may include a Probe' Module 226, which is a third party application for monitoring a network interface and generating the flow records 114 when a probe-quipped tap or router is not used.

The functionality of the Probe' Module 226 is equivalent to that of the Probe 110 which may be part of the Router 154 or of the Network Tap 104.

The Network Traffic Flow Analyzer 102 also includes the Database 206, which may be a third-party application and includes a persistent storage device 228 such as a hard disk or a solid state drive for example, for storage of network data and system state. Data stored in the Database 206, may also be stored in a Local Database 230 of the Computer Memory 204 for periods while the data is actively being processed by the Processor 202. Preferably, the Database 206 is a third-party structured query language (SQL) database, but persons skilled in the art may readily adapt the Network Traffic Flow Analyzer 102 to use another database type.

In a general sense, the architecture of the Network Traffic Flow Analyzer 102 comprises a software component container and various third-party applications. The software component container is an application, namely the Node package 214, in which various modular components (modules) are deployed and run. Components implement the logic of the system and expose APIs with which its services may be used. The Node package 214 provides additional functionality to the components, such as component name resolution, load balancing, and resource allocation.

The deployment architectures 100 and 150 depict a standalone system, in which all components run within one Node package 214. The third party applications (the Probe' Modules 226, and the Database 206) need not run on the same computing hardware as the Node package 214, but they do in the simplest deployment scenario.

Figure 3:
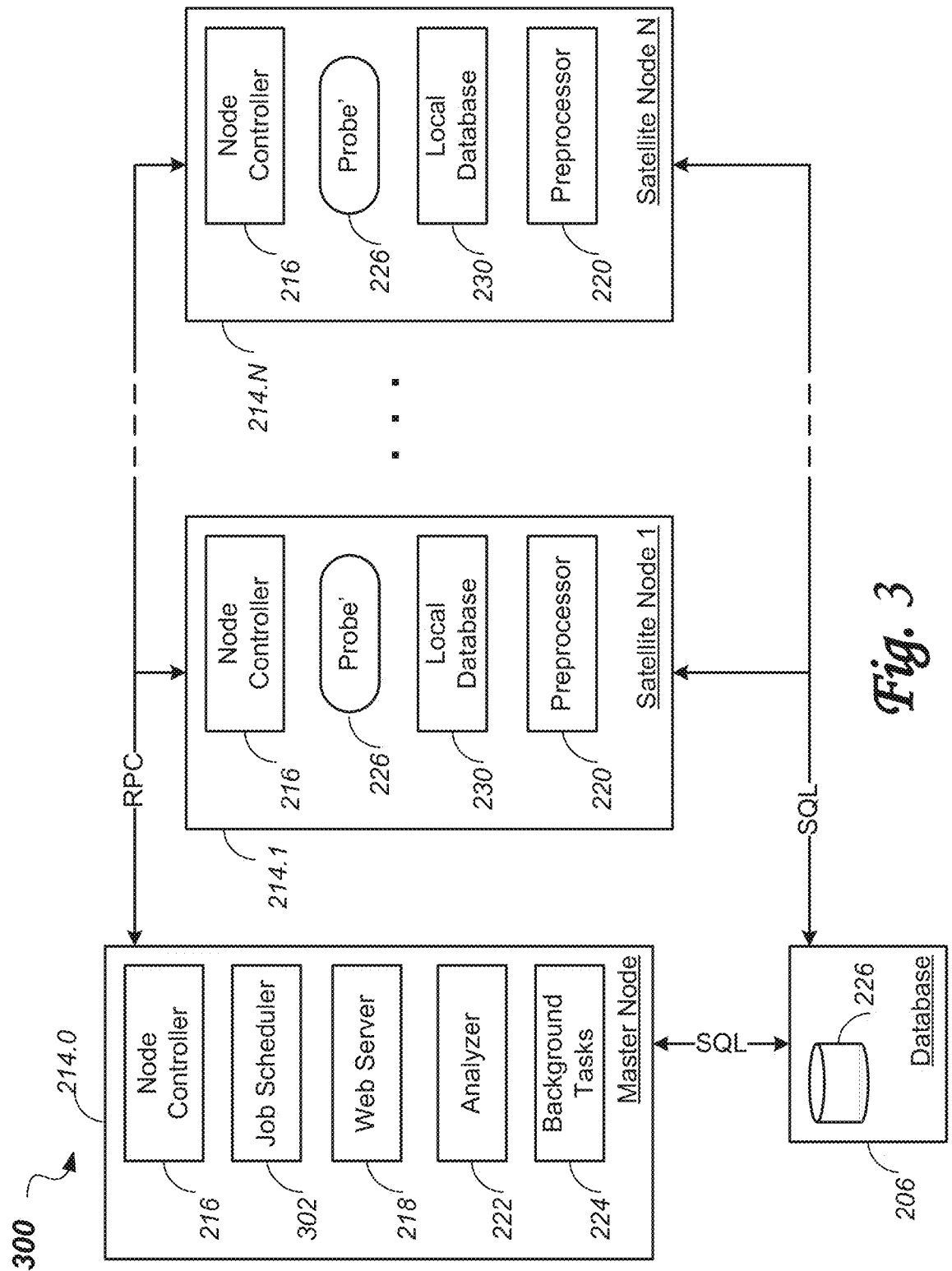
FIG. 3 shows an exemplary Multi-node Architecture 300.

FIG. 3 shows an exemplary Multi-node Architecture 300, including multiple Node packages 214.$i$ (i=0 to N) and a common single Database 206. FIG. 3 illustrates a distributed system that may be used to monitor a large enterprise network for example, which may generate more traffic than a single Probe 110 or a single Preprocessor module 220 can handle.

Individual components of Node packages 214 can be flexibly deployed in the nodes of the distributed system of the Multi-node Architecture 300, and may be running on one or more computer systems or on virtual machines within a cloud. Additional Node packages 214.$i$ may be provided in order to scale the system to meet various resource demands. Not every one of the Node packages 214.$i$ may need to be fully provisioned with all components of the Node package 214

In practical deployment scenarios of the Network Traffic Flow Analyzer 102, one or more node applications (Node packages 214) may be running on one or more computer systems or virtual machines within a cloud. The third-party applications (the Probe' Modules 226 and the Database 206) may run on separate computer systems or virtual machines, or co-exist with a node application. Each of the Node packages 214.$i$ will then contain a Node Controller module 216 plus zero or more instances of selected ones of the other three primary application modules (the Web Server module 218, the Preprocessor module 220, the Analyzer module 222, the Background Tasks component 224), as demand requires. For example, monitoring a very busy network may require additional pre-processing components (Preprocessor modules 220), while heavy analysis may require additional analyzer components (Analyzer module 222).

In the Multi-node Architecture 300 shown in FIG. 3, instances of the Analyzer module 222, the Web Server module 218, as well as of the Node Controller module 216 are provided in the Node package 214.0, which can be considered to be a Master Node of the system. Each of the Node packages 214.1 to 214.N, which can be considered to be Satellite Nodes 1 to N, is running instances of the Node Controller module 216, the Preprocessor module 220, and the Local Database 230. In addition, each Satellite Node may contain a local version of the Probe' Module 226. Preferably, the Master Node 214.0 also includes a Job Scheduler component 302 for distributing the work load among the Satellite Nodes 1 to N.

Traffic flow data from the Probe' Module 226 in each Satellite Node is written to the Local Database 230 until it can be preprocessed in the local Preprocessor module 220 and the preprocessed results stored in the primary Database 206.

The Satellite Nodes 214.1 to 214.N may communicate with the Master Node 214.0 using inter-process communication (IPC). The Satellite Nodes 214.1 to 214.N and the Master Node 214.0 use an SQL query protocol for communicating with the primary Database 206.

One of the problems associated with distributed computing is choosing the "best" resource to use for a given problem or demand. One simple, yet popular, method of choosing the best resource is to iterate through each node in a round-robin fashion, distributing work to each node without regard to the capacity of the node resources or requirements of the work itself. More intelligent mechanisms monitor characteristics of node systems, runtime environment, and network activity to affect the choice. Two such mechanisms are proposed in the following.

Distributed Node Monitoring

Each Satellite Node 214.$i$ contains a single instance of a Node Controller component 216. One of the responsibilities of this component is to monitor the resources of the node, such as processor and memory utilization, and make this information available to the Job Scheduler 302 in the Master Node 214.0. The job scheduler then uses this information to distribute work among the Satellite Nodes 214.$i$. As an example, consider a system with a number of Preprocessor components 220 running within different Satellite Nodes 214.$i$ on different real or virtual machines. Each Preprocessor component 220 can independently process a different chunk of incoming network data. When the Job Scheduler 302 has to choose a specific Preprocessor 220 in a Satellite Node 214.$i$ to operate on a chunk of data, it uses runtime statistics of the node to choose the one with the most available resources. Since node applications may also run other software components, computer systems may run non-related applications, or they may have different hardware specifications, using runtime statistics for job scheduling will result in a more evenly distributed use of computing resources.

Dynamic Allocation

Another problem with a distributed architecture is ensuring that sufficient resources are available to meet current need without over-provisioning. This is important in cases where, for example, computer systems are rented based on resource consumption. Dynamic allocation consists of monitoring various aspects of the system and starting or stopping nodes and components as required. Several different metrics may be monitored including:

1. Node runtime environment, including processor and memory usage
2. Monitored network activity, such as the number of network traffic flow records generated per second
3. Volume of various types of user requests, including access to the web interface of the system and requests for analysis for a dashboard or report.

These metrics form the basis of decisions to allocate or de-allocate components and nodes, with different conditions triggering different actions. In summary:

Deployment of preprocessor components is proportional to the activity of the monitored network i.e., network activity (as in item 2 above).

Deployment of web and analyzer components is proportional to the volume of incoming requests for those services (as in item 3 above).

Deployment of additional nodes is proportional to the resource usage of all other nodes.

The exact thresholds that trigger decisions to add or remove components and nodes are left as configurable options for the user.

Several advanced algorithms for controlling virtual machines within a cloud exist as commercial products. One such example is found within the "Windows Azure" cloud software. It offers a component that enables or disables virtual machines based on various monitored statistics, such as average CPU usage among existing virtual machines or the size of job or message queues. The difference in our mechanism is the monitoring of incoming traffic flow records and enabling or disabling virtual machines based on the volume of that data. US patent application 2009/0300210 discusses a cloud management system which allocates resources dynamically based on resource usage. While the prior art patent considers only cloud computing resources, in the present invention networking resources like flow records per second and various types of user requests are considered in a dynamic resource allocation technique.

Experimental Results

The received network traffic flow data records 114 describe raw flow data as byte and packet counts associated with various key attributes, such as source and destination IP addresses and ports. On an average enterprise network, the volume of data generated by even a single probe 110 can overwhelm analysis algorithms leading to a poor user experience. In order to improve analytical performance and improve the user experience, an analysis of the expected algorithms and queries was performed. It was found that the queries generally calculate data volumes, optionally filtering the results on one or more key attributes. As well, there is a need for a temporal dimension for some of the queries, to analyze the trending of data over time or within given time limits. It was found that the second and sub-second granularity of start and finish times of flows was not necessary for trend analysis, and more coarse units of time would deliver the desired results.

These analyses have led to the design of a data model to represent summarized flow data that optimizes queries of the form indicated, and a process for transforming raw flow data into the desired form. This process comprises several steps, as illustrated in the following.

A more detailed description of the functionality of the Network Traffic Flow Analyzer 102 is focused on the Single Node embodiment 200 of FIG. 2. In the Multi-Node architecture 300 of FIG. 3, the functions of the Preprocessor component 220 and, optionally functions in the Background Tasks components 224, are generally performed in a distributed manner as described above. It is not necessary to provide detailed descriptions of the Analyzer 222 and the Web Server 218, which are readily constructed by people skilled in the art of writing database query programs and interactive web applications respectively.

An enterprise network that is considered for monitoring with the Network Traffic Flow Analyzer 102 may generate a large volume of traffic flow records 114. Storing all of this data would require significant space and analyzing it would be far too slow to provide a reasonable user experience. According to methods of the invention, raw flow data is pre-processed and manipulated into a condensed form optimized for the types of analysis offered by the system.

Figure 4:
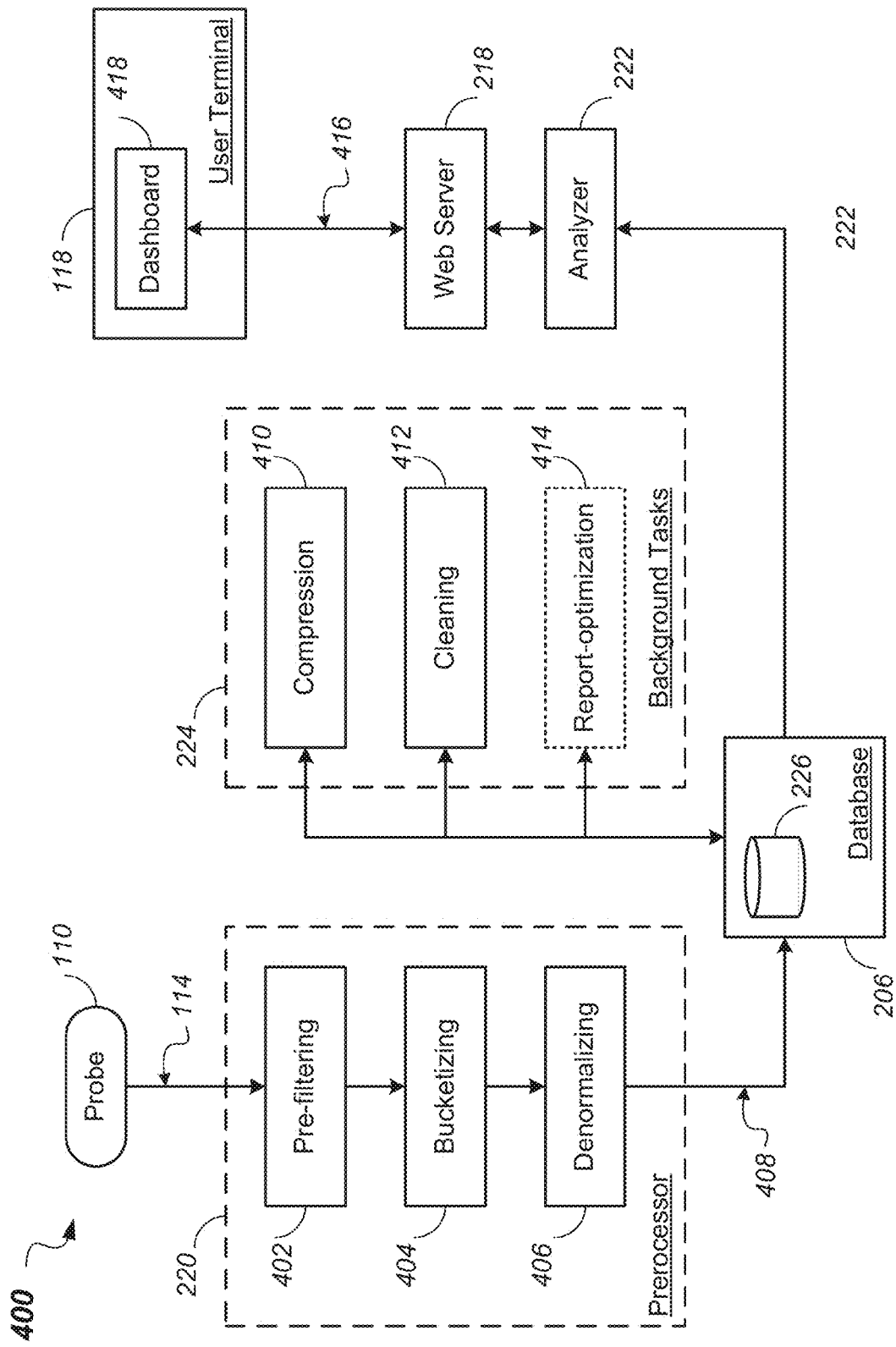
FIG. 4 shows a workflow diagram 400 of the Network Traffic Flow Analyzer 102.

FIG. 4 shows a workflow diagram 400 of the Network Traffic Flow Analyzer 102, summarized as follows:

The Probe 110 monitors a network and emits traffic flow data in the form of a stream of traffic flow records 114.

The stream of traffic flow records 114 is received in the Preprocessor component 220, which comprises: a Pre-filtering function 402; a Bucketizing function 404; and a Denormalization function 406.

The Preprocessor 220 sends preprocessed traffic flow data sets 408 to storage in the Database 206. The data sets, once they are stored in the Database 206, are further optimized by the Background Tasks components 224, namely a Compression function 410, a Cleaning function 412, and a Report-Optimization function 414.

The Database holds traffic flow data, pre-processed by the Preprocessor 220 and subsequently post-processed by the Background Tasks 224, for analysis by the Analyzer component 222, which creates certain analysis results by analyzing the stored traffic flow data under control of the user. The user may then select such analyzes and obtain analysis results 416 by interacting with a Dashboard 418 in the User Terminal 118, which is linked to the Analyzer 222 through the Web Server component 218.

Two mechanisms are presented to address the traffic flow record data volume issue by reducing the amount of data to be analyzed: pruning statistically less significant flows and processing the data into summarized formats.

Pre-Filtering Function 402: Reducing the Number of Flows by Pruning

The first method of reducing the data volume is to prune statistically less significant flows from the dataset of received traffic flow records 114. It is readily observed, that normal network traffic on enterprise networks consists of a very large number of very small flows, frequently as small as one packet. A preliminary analysis was performed with the Network Traffic Flow Analyzer 102 on several typical networks to determine appropriate pruning thresholds by which a significant number of small flows could be removed without introducing a significant statistical error.

TABLE 1

Actual Trace of Enterprise Traffic Flows

| Number of flows | Bytes per flow | Total bytes | % of flows | Bytes |
|---|---|---|---|---|
| 600,000 | Less than 50 | 24 Mbytes | 4% | Bytes of all these |
| 3,500,000 | Between 50 and 100 bytes | 258 Mbytes | 25% | short flows is less than 0.2% of total |
| 2,000,000 | Between 100 and 150 bytes | 248 MBytes | 14% | |
| 1,000,000 | Between 150 and 200 bytes | 188 Mbytes | 7% | |
| 300,000 | Between 200 and 250 bytes | 72 Mbytes | 2% | |
| 1,200,000 | Between 250 and 500 bytes | 450 Mbytes | 8% | |
| 1,300,000 | Between 500 and 1 K bytes | 922 Mbytes | 9% | |
| 4,000,000 | Above 1 K bytes | 48.5 Terabytes | 28% | |

Table 1 is an example trace record of a total of 14 million flows observed on a live enterprise network.

It was observed from the trace results that, if all flows with a size below a given byte size of 200 bytes are discarded, as many as 45% to 50% of the total number of flows are removed, but only a small percentage of ~0.2% of the total bytes, or aggregate bytes in all traffic flows, are lost.

Thus, the number of flows is halved while introducing very little error in the calculated byte count statistics. An initial pruning threshold of number-of-bytes in a flow was found to be a good way to eliminate a large number of short flows. This threshold could be a fixed static, or a configurable, pruning threshold. It is understood that the initial pruning threshold may have different values as required, for example it may be conveniently chosen in a range between 64 bytes and 1 kB, depending on the nature of the network and the traffic to be recorded, which may correspond to a resulting error of 0.1% to 5% respectively. It is also understood that other byte ranges for the initial pruning threshold may be chosen depending on a required accuracy.

For example, the small percentage of aggregate bytes in all traffic flows that is lost, may be selected in a range from about 0.1% to about 10%, and preferably in a range from about 0.05% to about 5%.

As an alternative, the pruning threshold may be dynamically adjusted by analyzing the obtained traffic data periodically or from time to time. After traffic has been monitored for a period, the pruning threshold may be assigned by the user to achieve specific error rate targets. Exact error rates are expected to differ between different enterprise networks, but the technique holds true in general: a significant reduction in flow volume is achieved by pruning very small flows below some threshold introduces little statistical error. By taking advantage of this observation of network behavior, the Network Traffic Flow Analyzer 102 system requires far less space for flow data storage, and analysis of the data is much improved in efficiency.

Bucketizing Function 404:

To take advantage of the nature of the most common analytical algorithms for processing the data stored in the Database 206, the raw flow data may be processed and stored in a specific way, namely it was found that the analytical algorithms focus on general trends, so second or sub-second granularity for flows is not necessary and creates extraneous data. Instead, in the embodiments of the invention the data is stored in uniform chunks or buckets of time that span between a few seconds to a few hours, for example between 30 seconds and 24 hours, and similar flow data is combined within that time. This reduces the granularity, and thus the volume, of flow data while otherwise maintaining its accuracy.

Figure 5:
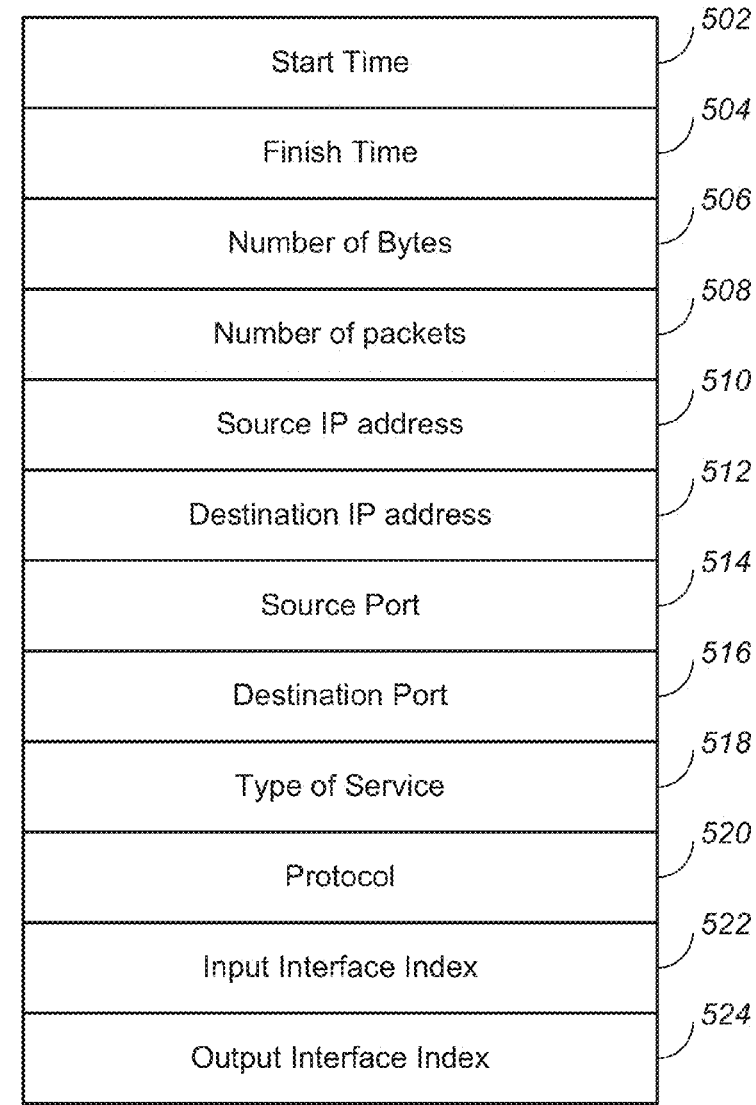
FIG. 5 shows a typical traffic flow record 500.

FIG. 5 shows a typical traffic flow record 500, including a partial list of fields indicating the start and finish times of the flow (502 and 504 respectively), the size of the flow in bytes 506 and number of packets (506 and 508 respectively), and attribute fields characterizing the flow (510-524), the values of which correspond to attributes of the packets which make up the flow, for example:

510: Source IP address;
512: Destination IP address;
514: Source port;
516: Destination port;
518: Type of Service;
520: Protocol;
522: Input Interface Index;
524: Output Interface Index; and
other fields, not shown.

The received traffic flow records indicate start and finish times as observed by the Probe 110. Depending on protocol, a flow record is sent by the Probe only after a flow has finished, that is, when either no new packets of the flow (e.g. UDP) are observed for a certain time or if a flow (e.g. TCP) is actively terminated. Flow records may also be sent by the Probe 110 periodically or from time to time, for example every 30 seconds, for very long active flows which are thus effectively reported as a number of separate flows.

Flows that start within a bucket time, and have the same attribute fields 510 to 524, can be aggregated into a single summarized flow record, simply by adding their byte counts and packet counts into summarized byte counts and packet counts respectively. A number of individual flow records are thus replaced with a single summarizing flow record.

The start time 502 of the summarized flow record are set to the start time of the bucket time. In other words, traffic flow entries that refer to the same fields in a bucket are combined, reducing the volume of data, while the granularity of the summarized flow records is uniformly the bucket size.

Such a bucketization mechanism is useful for generating reports over various time periods, spanning a few hours to months.

Several sets of tables may be created and maintained in the database 206, each with increasing bucket size and coverage period dependent on report duration, so that more recent reports are more granular. In a preferred embodiment, the Network Traffic Flow Analyzer 102 has four different bucket sizes. Network activity for the past hour is stored in a bucket size of T=30 seconds, whereas network activity for the past 3 months is stored in one-day buckets. Other bucket sizes may be one hour and one week. For near-real time display of network traffic behaviour, the short bucket size of 30 seconds is appropriate, allowing the user interface to be updated every 30 seconds. On the other hand, for the generation of traffic statistics reports, the larger bucket sizes are optimal. However, it is understood that other bucket sizes may be selected if required.

Table 2 shows a possible bucket hierarchy of four levels of bucket tables. The set of tables at each bucket level is also referred to as a bucket chain. At each bucket level, the respective bucket size, multiplied by the number of buckets at this level, yields a bucket coverage period representing a window which includes the summarized traffic data for a total of the coverage period. The proposed choices for bucket sizes and coverage periods is a compromise between the amount of memory required to retain older data, and the desire to have the ability of generating reports efficiently with as high a resolution as may be needed.

At the lowest bucket level (level 1), traffic flow records that refer to the same flow by virtue of matching flow attributes 510 to 524, are aggregated, that is their packet and byte counts are summed and a modified (summarized) flow record is stored in the bucket.

The contents of the higher bucket levels may be independently aggregated from the raw flow records received from the probe(s) as well. Alternatively, in a more efficient method, flow records that have already been aggregated in first-level buckets may be used as input to the bucketization process for the higher level buckets. That is, as soon as any lower level bucket is "closed", that is after all flows starting in the corresponding bucket time period have been recorded and aggregated, the contents of that bucket can be exported to the next higher level bucket. As the higher level bucket receives the, already aggregated, flow records from lower level buckets, these records are then further aggregated within the longer bucket time.

TABLE 2

Bucket level hierarchy

| level | bucket size | number of buckets | coverage period |
|---|---|---|---|
| 1 | 30 secs | 120 | 1 hour |
| 2 | 6 minutes | 240 | 1 day |
| 3 | 4 hours | 540 | 90 days |
| 4 | 1 day | 366 | 1 year |

As shown in Table 2, there are four bucket chains (or table sets), each with a defined duration (coverage period) and bucket size. For example, the smallest bucket chain has a one hour duration and a T=30 second bucket size, corresponding to 120 buckets in the chain.

The ratios between the time windows of different bucket sizes are chosen to be rational numbers. For example the level 2 bucket size (6 minutes) is larger than the level 1 bucket size (T=30 seconds) by a multiple M=12.

Additional bucket chains may be created from already existing chains, under user control, for example for generating data sets for displaying different periods of duration.

It is preferable to restrict changes in the bucket size to be either multiples or factors of the level 1 bucket size, which is currently 30. This makes it easier to convert one size to another since the bucket boundaries always line up. For example, the 30 second bucket can be divided into exactly five 6-second buckets, three 10-second buckets, or other factors. Similarly, multiple 30 second buckets can be combined into buckets of several minutes, which can later be divided back into 30 second buckets. Dividing one bucket into smaller, equal sized, buckets simply spreads their byte counts linearly. Other methods of curve-fitting could alternatively be used generate interpolated data for smaller buckets to improve the display of the results.

In order to provide dynamic adjustments of bucket sizes under user control, it is possible to monitor incoming network traffic to make recommendations to the user, and provide a user interface (UI) with which the user selects the bucket size for each chain. For example, control in the form of a slider between report granularity and performance may be provided, based on appropriate bucket sizes that are determined dynamically behind the scenes.

The Bucket sizes were originally chosen for presentation purposes. A 15 minute bandwidth graph, for example, displays a point every T=30 seconds. Since this was the most granular output required, 30 seconds was chosen for the smallest bucket size. As a result, 30 points can be shown for the 15 minute bandwidth graph. Other bucket sizes were also chosen to present a reasonable granularity of bandwidth graphs.

To determine appropriate bucket sizes for a given chain duration, one may monitor and record metrics of the incoming flow data. Two metrics are necessary: flow count and byte count for the last N minutes, where N is the duration (coverage period) of the bucket chain. The metrics can be sampled at various, random or periodic, times throughout the chain duration to account for variations in traffic behavior. From these values, it is then possible to determine bucket sizes and estimate the number of rows that would exist in the database for those bucket sizes. One can then map bucket sizes to the granularity vs performance slider mentioned above, placing a base bucket size in the middle, with smaller bucket sizes closer to the "granularity" side and larger bucket sizes on the "performance" side.

It is not expected that the user would change bucket size often. When a change is made, old data must be converted to the new size, as described above.

The number of buckets in each bucket chain is limited to the number required for the coverage period. To control memory use, the oldest data may be deleted before starting a next bucket window to in order to keep the number of buckets below the limit with or without a memory margin depending on implementation of the bucket chain. The memory margin may be useful when someone has a chain of M buffers, and needs to keep reusing the same memory space. It is sometimes may become useful to have a margin of at least 1 extra memory bucket space, so the oldest memory bucket may be deleted before starting a new memory bucket. Alternatively, the oldest memory bucket may be deleted before starting the new bucket, in the memory space of the just deleted oldest.

Figure 6:
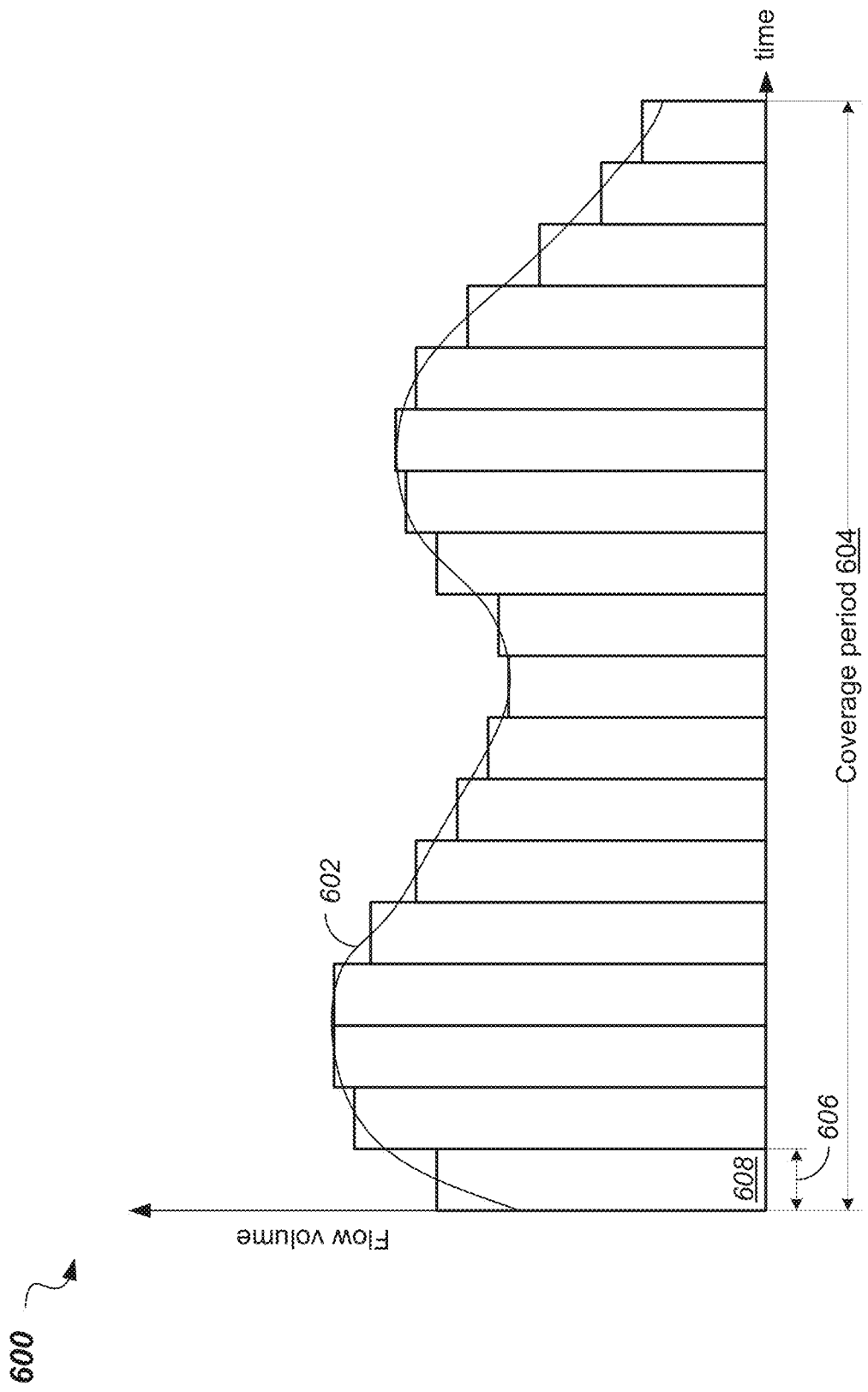
FIG. 6 illustrates a simplified example of a bucketization process 600.

FIG. 6 illustrates a simplified example of a bucketization process 600. An actual Flow Data curve 602 represents traffic observed on the network over time, as reported by one or more Probes 110. Instead of storing this highly granular information, the timeline of a coverage period 604 is divided into equal bucket periods 606, resulting in chunks 608, represented by rectangles, the height of each chunk 608 corresponding to the average traffic volume observed during a corresponding bucket period 606, for example the number of bytes or number of packets, observed during each respective bucket size period.

Each flow is processed individually during the bucketization process. When a flow falls entirely within the time frame (bucket period 606) of a given bucket, it is trivial to record its byte and packet counts for that bucket. However, often a flow starts within one bucket and ends within another. In these cases, the fraction of the flow that falls within each bucket is determined assuming a linear distribution for bytes transmitted and received for the flow's duration. The number of bytes of each portion of the flow to be assigned a given bucket is determined as follows:

Number of Bytes in Given Bucket $N_b$=(Number of bytes in flow)×(Time of flow in bucket)/(Time of bucket).

Essentially, the number of bytes that fall within a bucket is determined by the duration that the flow occupies in a bucket divided by the size of the bucket, multiplied by the number of bytes in the flow.

If no reported flow is longer than a single bucket period, even if the flow straddles bucket boundaries, and if longer flows are broken up into multiple flow records by the probe so that each separately reported flow portion covers at most one bucket period, then a bucket can always be "closed" when the time of the following bucket has expired. For efficiency, certain pre-processing operations should only be carried out on the fixed set of records in "closed" buckets to avoid unnecessary work, see below. If the bucket size is less than the duration of longest flow, as reported by the probe, then correspondingly more bucket periods must be considered before a bucket can be closed.

Report-Optimizing Function 414: Processing the Data into Summarized Formats

The Pre-filtering function 402 discussed above, performs pruning of incoming network traffic flow data as it arrives, before any further pre-processing or analysis. In the Report-Optimizing function 414, a similar technique may be applied to traffic flow data after it has been pre-processed, to improve the performance of certain types of analysis. It was found that a historical analysis of stored network traffic going back several months could take far too long to provide a quality user experience. After an investigation of data generated by several enterprise networks, it was determined that deleting data associated with small flows can dramatically improve performance while maintaining 95% or greater analysis accuracy of the generated analysis.

This secondary pruning technique can be applied as needed to improve the performance of long-term reports; it was found that shorter reports already executed quickly enough to not require this enhancement. When enabled, as part of background pre-processing, flows below a fixed size threshold may be archived instead of being included with datasets available for analysis. This allows the user to disable the feature at some future point, whereby the archived data is moved back into the "live" dataset. Preferably, the secondary pruning threshold may also be calculated to be a certain percentage X of the average flow size. Experiments that were carried out with live enterprise network traffic, have shown that a secondary pruning threshold as high as X=15% of average flow size can offer dramatic performance improvements while maintaining the previously mentioned 95% analysis accuracy goal. Testing has also been done with thresholds of X=5% and X=10%, resulting in approximate analysis accuracy values of 98% and 96% respectively. It is understood that different values for the secondary pruning threshold X may be selected depending on the required accuracy values, for example, conveniently X may be selected within a range of 0-30%.

In the embodiments of the invention, the value of X has been chosen in a range of 5 to 15%, corresponding to analysis accuracy in the range of 98% to 95% respectively.

Several alternatives are available for calculating an "average" byte count of a flow, including a running average, an average over all data, and an average per bucket. Furthermore, the secondary pruning threshold (another term is "post-pruning threshold") may be calculated dynamically based on the average flow size and a selected error rate target.

The accuracy of resulting reports and calculations (the analysis accuracy) is expressed in percent. A default for a target accuracy may be predetermined, e.g. 95%, or selected as a required value in a range from about 80% to about 100%. Other accuracy values are also possible. Such accuracy may also be a user selected value. The user can decide how much error is acceptable in the results versus how quickly those reports can be completed. The initial pruning flow size threshold as well as the post-pruning threshold can be calculated to result in a desired error rate. For post-pruning, the threshold can be calculated directly because the sizes of all flows for a given bucket are readily available. For the initial pruning, however, the system would have to learn about the nature of data on the network before a calculation can be done to give the desired error rate. This learning could be as simple as a running average of flow size on the actual network.

This is essentially where the percentage error and byte thresholds originate: percent error is chosen by the consumer and byte thresholds are determined such that reports meet or exceed that rate.

Denormalization Function 406: Creation of Additional Database Tables

Denormalization is a known database technique that can improve query performance in a relational database such as a SQL database, such as the Database 206 of the Network Traffic Flow Analyzer 102. Flow data is denormalized to take advantage of the fact that most queries restrict only a small number of key attributes. By default, a flow is stored as a set of key attributes, a bucket or time identifier, and byte & packet count data, in a normalized table. Additional tables are created containing duplicate information from this default table, with one or more key attribute columns removed and the data compressed accordingly. This results in smaller tables on which to run queries that include a common reduced set of key attributes.

As an example, consider flow data with three key attributes: A, B, and C. These could represent source or destination IP address or port, service class, conversation, or other columns found in flow data. The term "conversation" in this context refers to a pair of endpoints that exchange data. By default, algorithms would operate on a normalized table containing all three attributes, {A, B, C}. Other tables that can be created include: {A}, {B}, {C}, {A, B}, {A, C}, and {B, C}. If an algorithm specifies zero or one attribute, such as a search for a specific port, a single key table ({A}, {B}, or {C}) can be searched instead of the default. The single key tables contain a much smaller volume of data than the default, therefore improving the analytical performance dramatically.

Figure 7:
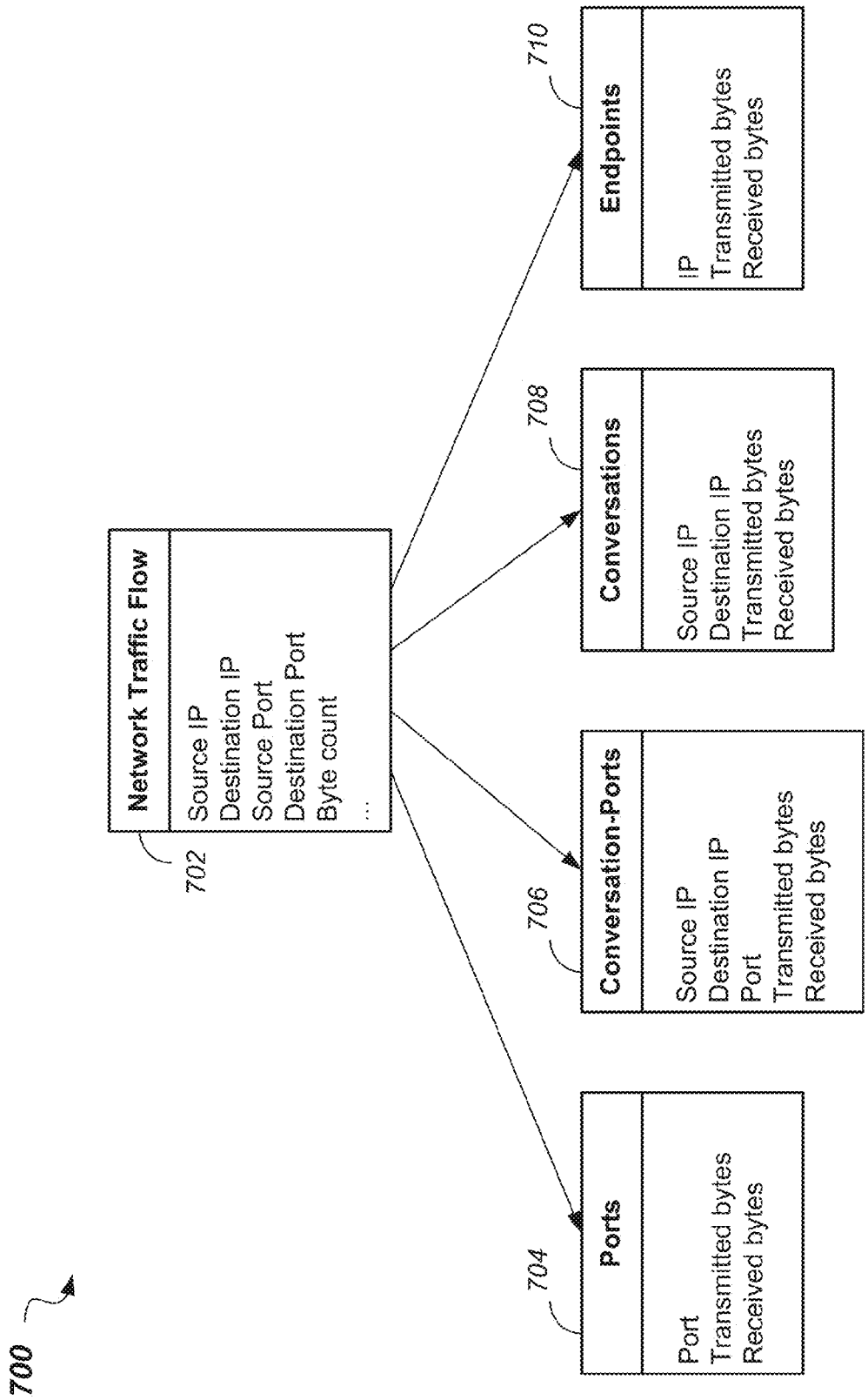
FIG. 7 shows an example of denormalization 700, including a Network Traffic Flow table 702, a Ports table 704, a Conversation-Ports table 706, a Conversations table 708, and Endpoints table 710.

FIG. 7 shows an example of denormalization 700, including a Network Traffic Flow table 702, a Ports table 704, a Conversation-Ports table 706, a Conversations table 708, and an Endpoints table 710.

Traffic flow data contains many attributes, including source and destination IP addresses and TCP/UDP ports, see FIG. 5. The Denormalization function 406 of the Preprocessor module 220 creates several supplementary tables that each contain a subset of the information found in the Network Traffic Flow table 702, which is originally created by the Bucketizing function 404. For example, the Ports table combines source and destination port, calculating byte counts for all transmitted and received data on each observed port. Within this table, IP addresses and all other Traffic Flow attributes are removed. Analysis that operates strictly on ports can then use this more specialized table, which would contain far less data than the original Traffic Flow table 702. This process naturally duplicates some data and requires more storage space, but it creates database tables that are tailored for specific types of queries. Each of these queries will then execute much faster on these summarized tables than equivalent queries on the original table.

In the current implementation of the Network Traffic Flow Analyzer 102, three denormalized tables are used for all analyses: the Ports table 704, the Conversation-Ports table 706, and the Conversations table 708. Based on specified filters and the type of analysis requested, the analysis software of the Analyzer module 222 determines which table is to be used. For example, a simple top port query would require only the ports table, whereas a top endpoint query for a specific port would use the conversation_ports table. For efficiency, only the tables 704, 706, and 708 are currently implemented to reduce the database size. Since the Conversations table 708 contains all of the information contained within the Endpoints table 710, all queries on the Endpoints table 710 can also be run against the Conversations table 708. However, having the separate Endpoints table 710 would improve the performance of some queries and reports, but would require some additional storage space.

It should be noted that bucketization and denormalization preferably operate in sequence. That is, once a current bucket period 606 is ended, and the current bucket can be closed (i.e. following the next bucket period, see above), the data in the bucket is used to create the denormalized tables by analyzing all entries in the Network Traffic Flow table 702 that are associated with this bucket. Similarly, denormalized tables may be created in the higher level buckets as well.

Compression 414: A Background Task

Once denormalization has been completed, each of the database tables generated by the Preprocessor may be compressed as a background activity to further reduce their size.

For example, there may be multiple rows in the "Ports" table, each with the same port number and bucket id. Summing their byte counts, reducing them to a single entry to represent a particular port and bucket, can combine these rows. As described above, buckets represent a specific window of time. In a live system, only the current bucket can be changed by new data. Once a bucket's time window has been closed after all flow records pertaining to flows that started in the time window have been received, its content is fixed. Therefore, buckets will not be compressed until their window has been closed; otherwise, new data could force the need for additional compression cycles.

Cleaning 412: A Background Task

To prevent database tables from growing without bound, network data is kept for a finite period of time, the coverage period, see Table 2 above. In general, the bucket size is proportional to the length of time in which data is stored, i.e. a specific fraction of the coverage period. Both, bucket size and coverage period are configurable at each level. When a bucket has been closed and a new bucket is created, the oldest bucket is removed, thereby maintaining a constant number of buckets. While there are no upper limits on the amount of data stored in an individual bucket, controlling the number of buckets helps to prevent the database from growing without bounds.

Figure 8:
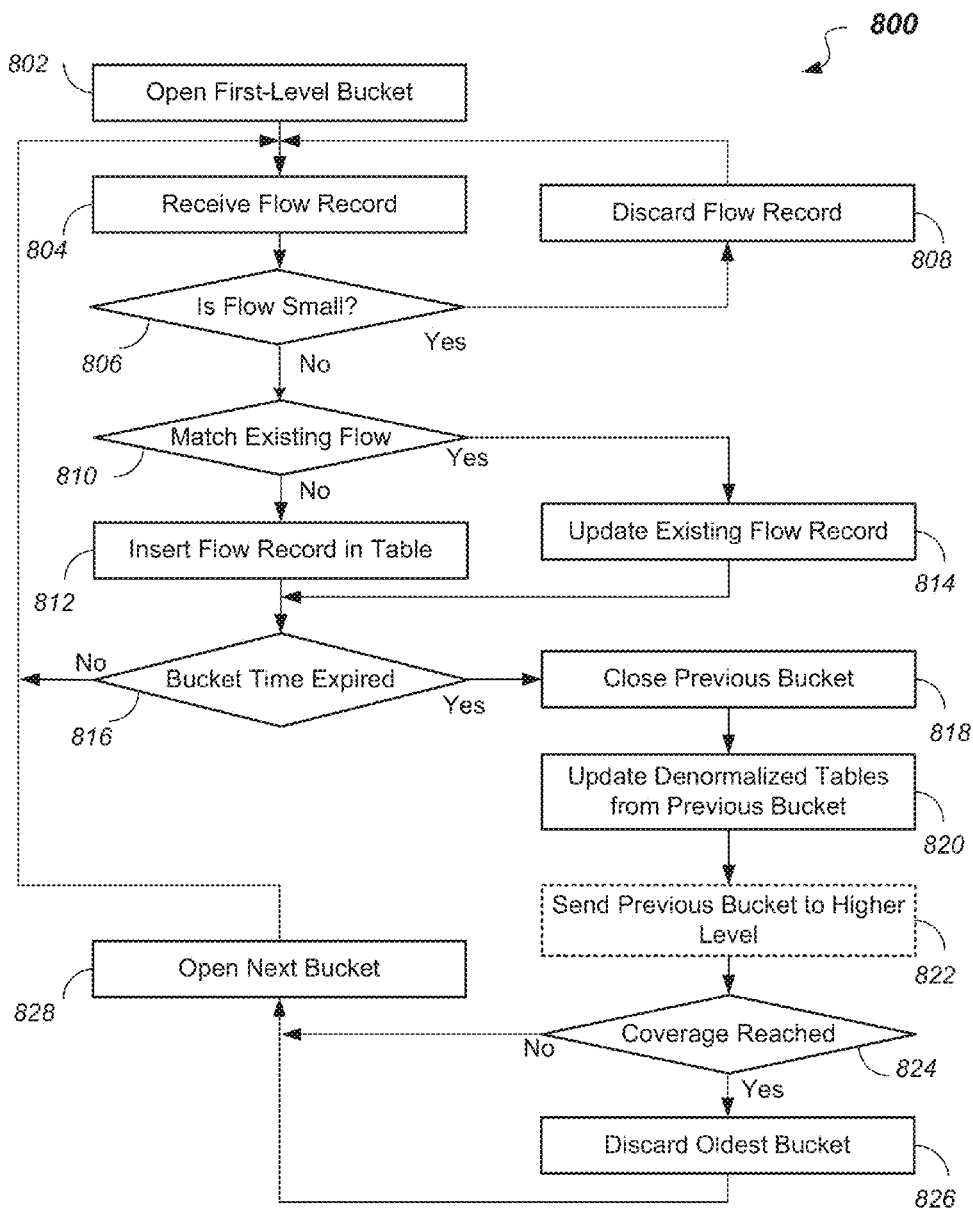
FIG. 8 shows a flowchart 800 of steps performed in the Preprocessor module 220 of FIGS. 2 and 4.

FIG. 8 shows a flowchart 800 of steps performed in the Preprocessor module 220 of FIGS. 2 and 4, including:
802: Open First-Level Bucket;
804: Receive Flow Record;
806: Is Flow small?;
808: Discard Flow Record;
810: Match Existing Flow?
812: Insert Flow Record in Table;
814: Update Existing Flow Record;
816: Bucket Time Expired?;
818: Close Previous Bucket;
820: Update Denormalized Tables from Previous Bucket;
822: Send Previous Bucket to Higher Level;
824: Coverage Limit Reached?;
826: Discard Oldest Bucket; and
828: Open Next Bucket;

The flowchart 800 describes steps for converting received flow records into entries for database tables in first-level buckets.

Flow records arrive in the order of their finish times 504 (FIG. 5), but are assigned to first-level buckets according to their start times 502 when they are registered in a database table.

In step 802 "Open First-Level Bucket", a first-level bucket is opened as the current bucket, into which flow records will be deposited (assigned) until the current bucket time, for example 30 seconds, expires.

After a flow record is received in step 804 "Receive Flow Record", it is determined in step 806 "Is Flow small?" whether the newly received flow record describes a small flow, that is a flow below a given byte size, that is a predetermined minimum threshold of bytes, which is also referred to as the initial pruning threshold.

If the byte count of the newly received flow record is smaller than the initial pruning threshold (for example 200 bytes), the newly received flow record is discarded in the step 808 "Discard Flow Record", and execution returns to the step 804.

Otherwise, execution continues with the step 810 "Match Existing Flow?", in which it is determined whether the attributes of the newly received flow record match those of an existing flow record that already exists in the current bucket or in the previous bucket. If there is no match, execution continues with the step 812 "Insert Flow Record in Table", in which the newly received flow record is inserted in the table and assigned to the current bucket.

If the newly received flow record does match an existing flow records, execution continues with the step 814 "Update Existing Flow Record", in which the existing flow record is updated by adding the byte and packet counts of the newly received flow record to the byte and packet counts respectively of the existing flow record, and changing the finish time of the existing flow record to the finish time of the newly received flow record. In other words, the newly received flow record and the existing flow record are merged into a single flow record which encompasses the packet and byte counts of both records.

It can be assumed that flows reported by the Probe 110 are never longer than a certain time, or they will have already been broken up into shorter segments by the Probe 110. Flow records are sent by the Probe 110 when the flow is finished. Consequently, flow records may have finish times in order, but their start times may be non-consecutive. As a result, two or more buckets must remain open to receive incoming flow records since a longer flow that started in a previous bucket time may be reported in the current bucket time, thereby straddling two or more bucket times. The earlier bucket will only be complete and can only be closed at the end of the current bucket period, because a flow record with a start time in the earlier bucket will only be received during a later bucket period. For simplicity, it is assumed that the longest reported flows are no longer than one bucket time, so only two buckets need to be kept open, the current and the previous bucket.

In the step 816 "Bucket Time Expired?", it is determined if the current bucket time is expired. This is indicated after pre-inspecting a next flow record that is about to be received, which has a start time beyond the end of the current bucket period.

If the current bucket time is thus expired, no more flow records that would fall into the previous bucket can be expected, and execution can continue with the step 818. But if the bucket time has not expired, the current and the previous buckets must remain open, and execution continues with the step 804 to receive the next flow record that was already pre-inspected.

In the step 818 "Close Previous Bucket", any flow records that indicate a start in the previous bucket and a finish in the current bucket, are split into two records, with byte and packet counts divided proportionately between the split records as indicated above, i.e. in proportion to the times the flow has spent in the two buckets. At this point the previous bucket can be closed, its content is now fixed, and subsequent processing actions can be taken on the flow records of the previous bucket, i.e. denormalization 406 (FIG. 4) and compression 410.

In the step 820 "Update Denormalized Tables from Previous Bucket", the flow records of the previous bucket are used to update the denormalized tables as described above, see FIG. 7.

Higher level buckets may be created and filled independently by repeating the steps 810 to 828 for each bucket level. However, the already optimized flow records of the previous bucket are preferably exported in the optional step 822 "Send Previous Bucket to Higher Level", to be added to the current second-level bucket to be further optimized, i.e. by aggregating the flows from a series of first-level buckets into (secondary) summarized flow records in the second-level bucket.

As discussed above, for memory capacity reasons the coverage period of the first-level buckets should be limited to a number of bucket periods, e.g. 120 buckets which would cover 60 seconds, i.e. one minute. In the step 824 "Coverage Reached?", it is determined whether this limit is reached. During an initial start-up period this limit will not be reached until the predefined number of bucket periods have been filled (exit "NO" from step 824). A next bucket following the current bucket is then opened in the step 828 "Open Next Bucket". But the coverage limit will be reached eventually (exit "YES" from step 824), and in the steady state the coverage limit is then reached permanently. In that case, before opening a new bucket, the oldest bucket, i.e. the set of flow records assigned to the oldest bucket, is discarded in the step 826 "Discard Oldest Bucket".

The flow chart 800 has been described in detail in relationship to the first-level buckets. The higher level buckets may be filled in a similar way by exporting the already summarized flow records from the lower level buckets, as soon as each lower level bucket is complete, in the optional export step 822. The export step may also be carried out in the background, in the report-optimization function 414 (see FIG. 4) to prune and optimize the tables created in parallel for the higher level buckets.

Asynchronous event processing and push technologies provide for a very responsive user experience. The Analyzer 222 is event based and processes flow data when it arrives and has been preprocessed by the Preprocessor 220 and stored in the Database 206, after which an event is posted. This makes data available for analytics almost immediately after it has been collected by the Probe 110. One or more active dashboards 418 respond to these "pre-processing finished" events by reanalyzing the data and pushing those changes to the browser in the User Terminal 118 using a socket.io procedure. By using these techniques the user can be provided with an interactive dashboard that reflects the current state of the network as closely as possible.

The user interface of the Network Traffic Flow Analyzer 102 has been designed to provide users with a simple framework to quickly and easily manipulate very large, complex and real-time network traffic data.

Figure 9:
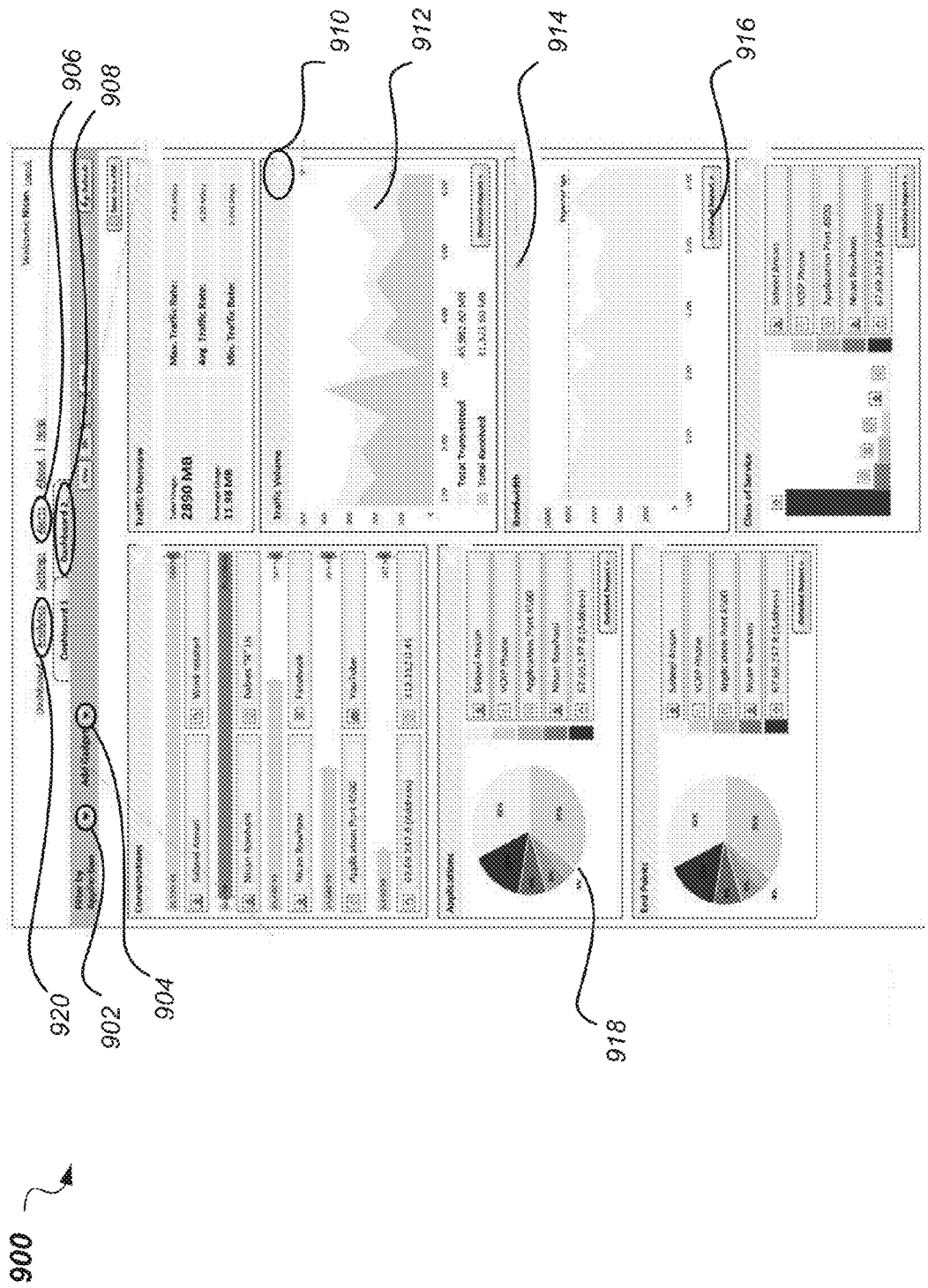
FIG. 9 shows an exemplary dashboard display 900 of the user interface that may be displayed on the Dashboard 418 of FIG. 4.

FIG. 9 shows an exemplary dashboard display 900 of the user interface that may be displayed on the Dashboard 418 of FIG. 4, including various controls, and data displays:

902: a filter control, providing a menu for selecting filtering criteria such as IP group, Application (port), class of service, individual IP, domain, or conversation;
904: an "Add Gadget" control, providing a menu for adding additional gadgets to the dashboard;
906: an Alerts control, for setting thresholds for traffic alerts;
908: a tab selector for selecting custom dashboards for different users;
910: a typical "Close Gadget" control for removing a gadget from the dashboard;
912: a typical gadget displaying real-time network traffic data;
914: a window bar in a network gadget, providing drag and drop/edit/move/delete functionality;
916: a control for initiating report generation for data displayed in the gadget;
918: a typical pie chart display of network traffic volume, keyed by application in this example; and
920: a selector for opening an Analytics feature.

The dashboard provides the user of the Network Traffic Flow Analyzer 102 with a real-time view of the analyzed network data. The dashboard is designed to be flexible, which means users can add/remove/move the various network traffic-specific 'gadgets' to customize the view as desired.

The Analytics user interface (920) provides the user with an intuitive, rapid and flexible method for forensics of network traffic flows. The users can dynamically analyze large and complex data sets (network traffic data) by applying a number of pre-defined real-time "filters" to develop a 'view' of the data that provides the desired information or perspective, which can be in the form of a line/bar/pie or similar chart, as shown in FIG. 9. Filters can be independently applied/unapplied and final views can be saved as a new 'gadget' for use on the dashboard. The user interface (UI) allows the user to create new filter-types that are included by default.

As defaults, the following flow and DPI (deep packet inspection) filters are provided:

Sample Flow Filters:

| | |
|---|---|
| IP address | Protocol |
| Application | Autonomous system |
| IP address group | Time (relative/absolute) |
| Conversation | ingress/egress |
| Class of Service | Country |
| Domain | Bytes |
| Packets | Flows |

Sample DPI Filters:

| | |
|---|---|
| Bittorent | Dropbox |
| Facebook | Twitter |
| Skype | iTunes |
| Youtube | Netflix |
| iCloud | |

The techniques of bucketization and pruning can be applied to other areas in which data, which has certain properties and values, is recorded over time and analyzed. For example, data mining and affinity analysis involves searching for trends in large datasets, such as retail purchases or stock market trades. In such applications, aggregation and pruning can be performed on various metrics, such as price or quantity, for example. In each case, bucketization can be applied to reduce the size of datasets at the cost of granularity. Similarly, pruning can be used to remove statistically less significant events. Both techniques may be thus used to improve the performance of analytical algorithms.

The implementation of the Network Traffic Flow Analyzer 102 has been described as a practical example for evaluating, analysing, and displaying traffic flows in a network. Bucketization of the flows is based on a hierachy of bucket levels, covering window periods T from 30 seconds to 1 day in the example of Table 2. However, depending on applications different window sizes from as short as 1 second to as long as a year may be appropriate, as may be a more shallow or deeper bucket window hierarchy, ranging from two levels to as many as sixteen levels or more. Accordingly, and depending on the number of bucketization levels employed, the ratio M between the window sizes of successive bucketization levels may be as small as two, up to 100 and more. It is also noted that flow records are received from the Probe 110 at regular intervals. e.e. every 30 seconds. This interval is conveniently configured to coincide with the smallest bucket window size.

The discarding of small traffic flows, also termed "pruning" is provided for the benefit of higher efficiency and performance in the analysis phase. Initial pruning is based on a default threshold of 200 bytes in the example implementation described. This threshold is appropriate for achieving an accuracy of around 99.8% in a typical network. However, the threshold may be adjusted, either explicitly by the user, or automatically and dynamically, to achieve any desired accuracy between 50% and 100%. The actual byte size threshold value also depends to a great degree on the nature of the network that is monitored. For example, in a general network in which large files are typically downloaded, the corresponding large flows will dwarf any small flows, as described above. On the other hand, networks in which downloading of files is not a frequent occurrence, and small flows constitute the bulk of the traffic, a byte size threshold of even smaller flows, as small as a few bytes, may be necessary to achieve a reasonable accuracy. Conversely, it may even be of interest in some applications to exclude large flows instead of small flows. This would improve an analysis of small flow traffic.

After each bucket is closed, the data is available for the analysis. In order to speed up the analysis, a secondary pruning phase is provided in which small flows can be removed, depending on the need for accuracy. In this instance, flows ranging in size from X=0.1% to X=50% of the average flow size can be excluded from the analysis while achieving corresponding accuracy values in the range from 50 to 99.9%.

While the description of the embodiment has been with regards to optimizing the processing of traffic flow records for efficiency and consistency of the user experience, it should be clear that this application of the invention is only an example.

Although the embodiments of the invention have been described in detail, it will be apparent to one skilled in the art that variations and modifications to the embodiment may be made within the scope of the following claims.

What is claimed is:

1. A method for processing network traffic flow data, comprising:
   (a) storing flow records characterizing traffic flows, obtained from a network probe device, in memory buckets of first and second bucket chains, the first and second bucket chains having memory buckets corresponding to respective first and second predetermined time windows, wherein the first predetermined time window is T seconds, and the second predetermined time window is equal to, and coincident with, a predetermined number of the first predetermined time windows;
   further comprising determining a given byte size, comprising:
   determining a statistical flow profile of traffic flow data, comprising a distribution of number of traffic flows according to respective byte sizes;
   selecting, from said distribution, the given byte size so that an aggregate of bytes
   in traffic flows having a size below the given byte size represents a predetermined small percentage of aggregate bytes in all traffic flows in said distribution; and
   storing the traffic flows of at least a byte size that exceeds the given byte size; wherein count of memory buckets in the first and second bucket chains is limited to respective fixed values, and wherein oldest memory buckets are deleted before starting new memory buckets to keep the count of memory buckets below the respective fixed values;
   and
   (b) for each memory bucket, aggregating sizes of the stored flow records, having corresponding selected flow attributes, into summarized flow records.

2. The method of claim 1, wherein the step (b) further comprises:
   for each memory bucket in the second bucket chain, filling said each memory bucket with the summarized flow records of corresponding-M memory buckets of the first bucket chain.

3. The method of claim 1, wherein the step (b) further comprises aggregating summarized flow records of the second bucket chain, which are obtained from summarized records of the first bucket chain.

4. The method of claim 1, wherein the step (a) further comprises splitting a flow record characterizing a traffic flow, which extends over parts of two or more consecutive predetermined time windows, into two or more flow records, each having traffic flow sizes equal to a respective fraction of a traffic flow size according to a duration of the traffic flow that falls in each predetermined time window respectively.

5. The method of claim 1, wherein the step (b) further comprises delaying the aggregating until all flows within the predetermined time window is completed.

6. The method of claim 1, wherein the step (b) further comprises limiting processing of the summarized flow records to those summarized flow records, which characterize traffic flows of a byte size of at least X percent of an average byte size of all stored traffic flows.

7. The method of claim 1, wherein the steps (a) and (b) are performed in multiple processors by processing different traffic flows in parallel.

8. A system for processing traffic flow data received from a network probe device, comprising:
   a processor and a computer readable storage medium having computer readable instructions stored thereon for execution by the processor, causing the processor to:
   (a) store flow records characterizing traffic flows, obtained from the network probe device, in memory buckets of first and second bucket chains, the first and second bucket chains having memory buckets corresponding to respective first and second predetermined time windows, wherein the first predetermined time window is T seconds, and the second predetermined time window is equal to, and coincident with, a predetermined number of the first predetermined time windows;
   further causing the processor to determine a given byte size, comprising:
   determining a statistical flow profile of traffic flow data, comprising a distribution of number of traffic flows according to respective byte sizes;
   selecting, from said distribution, the given byte size so that an aggregate of bytes
   in traffic flows having a size below the given byte size represents a predetermined small percentage of aggregate bytes in all traffic flows in said distribution; and
   storing the traffic flows of at least a byte size that exceeds the given byte size; wherein count of memory buckets in the first and second bucket chains is limited to respective fixed values, and wherein oldest memory buckets are deleted before starting new memory buckets to keep the count of memory buckets below the respective fixed values;
   and
   (b) for each memory bucket, aggregate sizes of the stored flow records, having corresponding selected flow attributes, into summarized flow records.

9. The system of claim 8, wherein the computer readable instructions further cause the processor:
   for each memory bucket in the second bucket chain, to fill said each memory bucket with the summarized flow records of corresponding-M memory buckets of the first bucket chain.

10. The system of claim 8, wherein the computer readable instructions further cause the processor to aggregate summarized flow records of the second bucket chain, which are obtained from summarized records of the first bucket chain.

11. The system of claim 8, wherein the computer readable instructions further cause the processor to split a flow record characterizing a traffic flow, which extends over parts of two or more consecutive predetermined time windows, into two or more flow records, each having traffic flow sizes equal to a respective fraction of a traffic flow size according to a duration of the traffic flow that falls in each predetermined time window respectively.

12. The system of claim 8, wherein the computer readable instructions further cause the processor to delay the aggregating until all flows within the predetermined time window is completed.

13. The system of claim 8, wherein the computer readable instructions further cause the processor to limit the processing of the summarized flow records to those summarized flow records, which characterize traffic flows of a byte size of at least X percent of an average byte size of all stored traffic flows.

14. The system of claim 8, comprising multiple processors for processing different traffic flows in parallel.

15. The method of claim 1, wherein the predetermined small percentage is in a range from about 0.05% to about 10%.

16. The method of claim 1, wherein the predetermined small percentage is in a range from about 0.1% to about 5%.

17. The method of claim 8, wherein the given byte size is in a range from about 64 bytes to about 1 kB.

18. The system of claim 8, wherein the predetermined small percentage is in a range from about 0.05% to about 10%.

19. The system of claim 8, wherein the predetermined small percentage is in a range from about 0.1% to about 5%.

20. The system of claim 1, wherein the given byte size is in a range from about 64 bytes to about 1 kB.

\* \* \* \* \*